United States Patent
Guo et al.

(10) Patent No.: US 11,308,636 B2
(45) Date of Patent: Apr. 19, 2022

(54) METHOD, APPARATUS, AND COMPUTER-READABLE STORAGE MEDIUM FOR OBTAINING A TARGET IMAGE

(71) Applicant: GUANGDONG OPPO MOBILE TELECOMMUNICATIONS CORP., LTD., Guangdong (CN)

(72) Inventors: Ziqing Guo, Guangdong (CN); Haitao Zhou, Guangdong (CN); Guohui Tan, Guangdong (CN); Fangfang Hui, Guangdong (CN); Xiao Tan, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 157 days.

(21) Appl. No.: 16/740,925

(22) Filed: Jan. 13, 2020

(65) Prior Publication Data

US 2020/0151891 A1    May 14, 2020

Related U.S. Application Data

(63) Continuation of application No. PCT/CN2019/080559, filed on Mar. 29, 2019.

(30) Foreign Application Priority Data

Apr. 28, 2018 (CN) .......................... 201810403332.2
Apr. 28, 2018 (CN) .......................... 201810404508.6

(51) Int. Cl.
*G06K 9/00* (2006.01)
*G06T 7/521* (2017.01)
(Continued)

(52) U.S. Cl.
CPC .......... *G06T 7/521* (2017.01); *G06K 9/00255* (2013.01); *G06Q 20/322* (2013.01);
(Continued)

(58) Field of Classification Search
CPC ........... G06T 7/521; G06T 2207/20132; G06T 2207/30201; G06K 9/00255
See application file for complete search history.

(56) References Cited

U.S. PATENT DOCUMENTS

2011/0025827 A1    2/2011  Shpunt et al.
2013/0251215 A1*   9/2013  Coons ................ H04N 5/23219
                                                                  382/118
(Continued)

FOREIGN PATENT DOCUMENTS

CN    101216889 A    7/2008
CN    104063034 A    9/2014
(Continued)

OTHER PUBLICATIONS

Continuous Real-time Heart Rate Monitoring from Face Images, Tatsuya Mori et., Scitepress, ISBN 978-989-758-170-0, 2016, pp. 52-56 (Year: 2016).*

(Continued)

*Primary Examiner* — Jayesh A Patel
(74) *Attorney, Agent, or Firm* — Young Basile Hanlon & MacFarlane, P.C.

(57) ABSTRACT

An image processing method, an apparatus, a non-transitory computer readable storage medium and an electronic device are disclosed. The method includes: acquiring an accuracy level of a target application in response to an image collecting instruction initiated by the target application; adjusting an accuracy of an image to be sent according to the accuracy level, and obtaining a target image; and sending the target image to the target application.

17 Claims, 10 Drawing Sheets

(51) Int. Cl.
  *G06Q 20/32* (2012.01)
  *G06Q 20/40* (2012.01)
(52) U.S. Cl.
  CPC .................. *G06Q 20/40145* (2013.01); *G06T 2207/20132* (2013.01); *G06T 2207/30201* (2013.01)

(56) References Cited

U.S. PATENT DOCUMENTS

| | | |
|---|---|---|
| 2014/0085507 A1 | 3/2014 | Pillman et al. |
| 2015/0244935 A1* | 8/2015 | Meier ................. G06K 9/00664 348/372 |
| 2015/0325039 A1 | 11/2015 | Lynch |
| 2016/0080652 A1* | 3/2016 | Shirota ................... G06F 21/83 348/222.1 |
| 2017/0013231 A1 | 1/2017 | Kwon |
| 2018/0157899 A1* | 6/2018 | Xu ....................... G06K 9/4628 |

FOREIGN PATENT DOCUMENTS

| | | | |
|---|---|---|---|
| CN | 104936017 A | | 9/2015 |
| CN | 105430251 A | | 3/2016 |
| CN | 105847883 A | | 8/2016 |
| CN | 107105167 A | | 8/2017 |
| CN | 107292283 A | * | 10/2017 |
| CN | 107292283 A | | 10/2017 |
| CN | 107832677 A | | 3/2018 |
| CN | 108537187 A | | 9/2018 |
| CN | 108549867 A | | 9/2018 |
| CN | 108573170 A | | 9/2018 |
| CN | 108711054 A | | 10/2018 |
| CN | 108881712 A | | 11/2018 |
| WO | 2014143689 A1 | | 9/2014 |

OTHER PUBLICATIONS

OA with English Translation for CN Application 201810403332.2.
ISR with English Translation for PCT application PCT/CN2019/080559 dated Jul. 3, 2019.
OA with English Translation for CN Application 201810404508.6.
European Search Report dated Jun. 24, 2020 for EP application 19792627.2.
Indian Examination Report for IN Application 202017001719 dated Jul. 8, 2021. (6 pages).
Communication pursuant to Article 94(3) EPC for EP Application 19792627.2 dated Nov. 11, 2021. (7 pages).

* cited by examiner

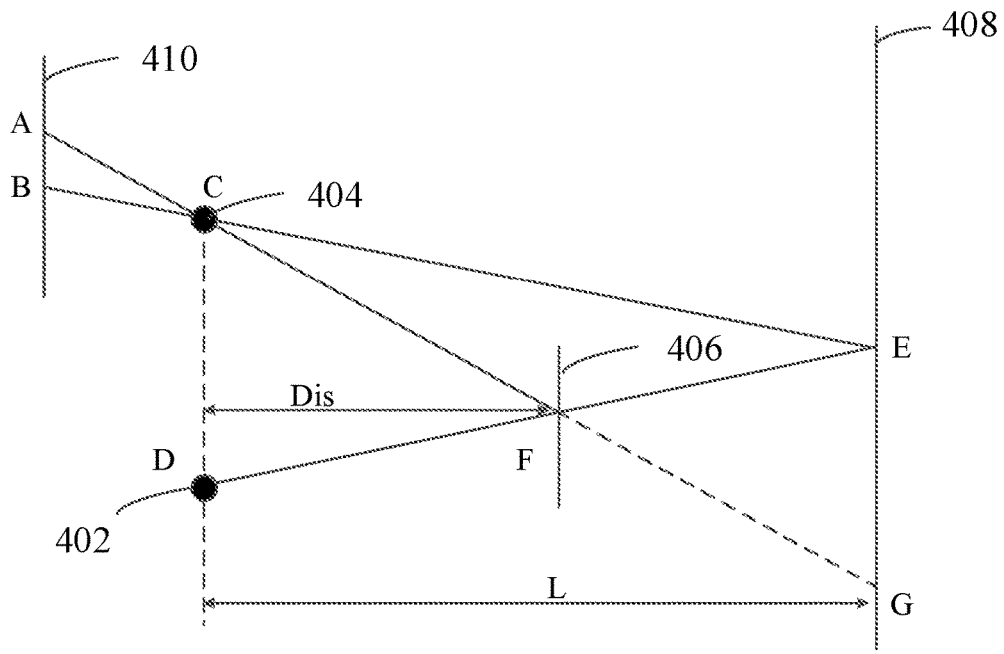

FIG. 5

1502
A time stamp contained in the image acquisition instruction is acquired, in which the time stamp is configured to represent a time point of initiating the image acquisition instruction.

1504
An encryption level is acquired according to an interval between the time stamp and a current time point, and an encryption processing corresponding to the encryption level is performed on the target image according to the reference image.

FIG. 6

```
                                                        ┌─ 2302
┌──────────────────────────────────────────────────────────┐
│ The image to be sent is acquired in response to the image acquisition │
│ instruction.                                             │
└──────────────────────────────────────────────────────────┘
                            │
                            ▼                           ┌─ 2304
┌──────────────────────────────────────────────────────────┐
│ In response to detecting a face area in the image to be sent, the application │
│ level corresponding to the target application that initiates the image acquisition │
│ instruction is acquired, and the safety level of the application operation │
│ corresponding to the image acquisition instruction is acquired. │
└──────────────────────────────────────────────────────────┘
                            │
                            ▼                           ┌─ 2306
┌──────────────────────────────────────────────────────────┐
│ The accuracy level is acquired according to the application level and the safety │
│ level.                                                   │
└──────────────────────────────────────────────────────────┘
                            │
                            ▼                           ┌─ 2308
┌──────────────────────────────────────────────────────────┐
│ The accuracy of the image to be sent is adjusted according to the accuracy │
│ level, and the target image is obtained.                │
└──────────────────────────────────────────────────────────┘
                            │
                            ▼                           ┌─ 2310
┌──────────────────────────────────────────────────────────┐
│ The running state of the target application is acquired. │
└──────────────────────────────────────────────────────────┘
                            │
                            ▼                           ┌─ 2312
┌──────────────────────────────────────────────────────────┐
│ In response to the target application running in the foreground, the │
│ reference image pre-stored in the electronic device is acquired, and the target │
│ image is encrypted according to the reference image, in which the reference │
│ image is an image containing reference speckle points and obtained by │
│ calibration.                                             │
└──────────────────────────────────────────────────────────┘
                            │
                            ▼                           ┌─ 2314
┌──────────────────────────────────────────────────────────┐
│ The encrypted target image is sent to the target application. │
└──────────────────────────────────────────────────────────┘
```

FIG. 9

METHOD, APPARATUS, AND COMPUTER-READABLE STORAGE MEDIUM FOR OBTAINING A TARGET IMAGE

CROSS-REFERENCE TO RELATED APPLICATION(S)

The present application is a continuation application of PCT application No. PCT/CN2019/080559, which claims priorities and benefits to Chinese Patent Application Nos. 201810403332.2 and 201810404508.6, both filed on Apr. 28, 2018, the disclosures of all of which are incorporated herein by reference in their entireties.

TECHNICAL FIELD

The present disclosure relates to a field of computer technology, and more particularly, to an image processing method and apparatus, and a computer readable storage medium.

BACKGROUND

In the age of the Internet, in order to realize information communication and sharing, it is necessary to transmit data. Therefore, data transmission is extremely frequent and significant.

SUMMARY

Embodiments of the present disclosure provide an image processing method and apparatus, and a computer readable storage medium.

An image processing method is provided. The method includes: acquiring an accuracy level of a target application in response to an image collecting instruction initiated by the target application; adjusting an accuracy of an image to be sent according to the accuracy level, and obtaining a target image; and sending the target image to the target application.

An image processing apparatus is provided. The apparatus includes: one or more processors; a memory storing instructions executable by the one or more processors; wherein the one or more processors are configured to: acquire an accuracy level of a target application in response to an image collecting instruction initiated by the target application; adjust an accuracy of an image to be sent according to the accuracy level, and obtain a target image; and send the target image to the target application.

A computer readable storage medium having a computer program stored thereon is provided. When the computer program is executed by a processor, the computer program implements an image processing method, in which the method includes: acquiring an accuracy level of a target application in response to an image collecting instruction initiated by the target application; adjusting an accuracy of an image to be sent according to the accuracy level, and obtaining a target image; and sending the target image to the target application.

BRIEF DESCRIPTION OF DRAWINGS

In order to clearly illustrate technical solutions of embodiments of the present disclosure or in the prior art, a brief description of drawings used in embodiments or the prior art is given below. Obviously, the drawings in the following descriptions are only part embodiments of the present disclosure, and for those skilled in the art, other drawings can be obtained according to these drawings without creative labor.

FIG. 5 is a schematic diagram of calculating depth information according to an embodiment.

FIG. 6 is a flowchart of an image processing method according to yet another embodiment.

FIG. 9 is a flowchart of an image processing method according to yet another embodiment.

DETAILED DESCRIPTION

In order to make objects, technical solutions and advantages of the present disclosure more apparent, the present disclosure will be described in further detail below with reference to the accompanying drawings and embodiments. It should be understood that the specific embodiments described herein are merely used to explain the present disclosure and are not intended to limit the present disclosure.

It may be understood that the terms "first", "second" and the like as used herein may be used to describe various elements, but these elements are not limited by these terms. These terms are only used to distinguish one element from another. For example, a first client may be referred to as a second client, and similarly, the second client may be referred to as the first client, without departing from the scope of the present disclosure. Both the first client and the second client are clients, but they are not the same client.

Figure 1:
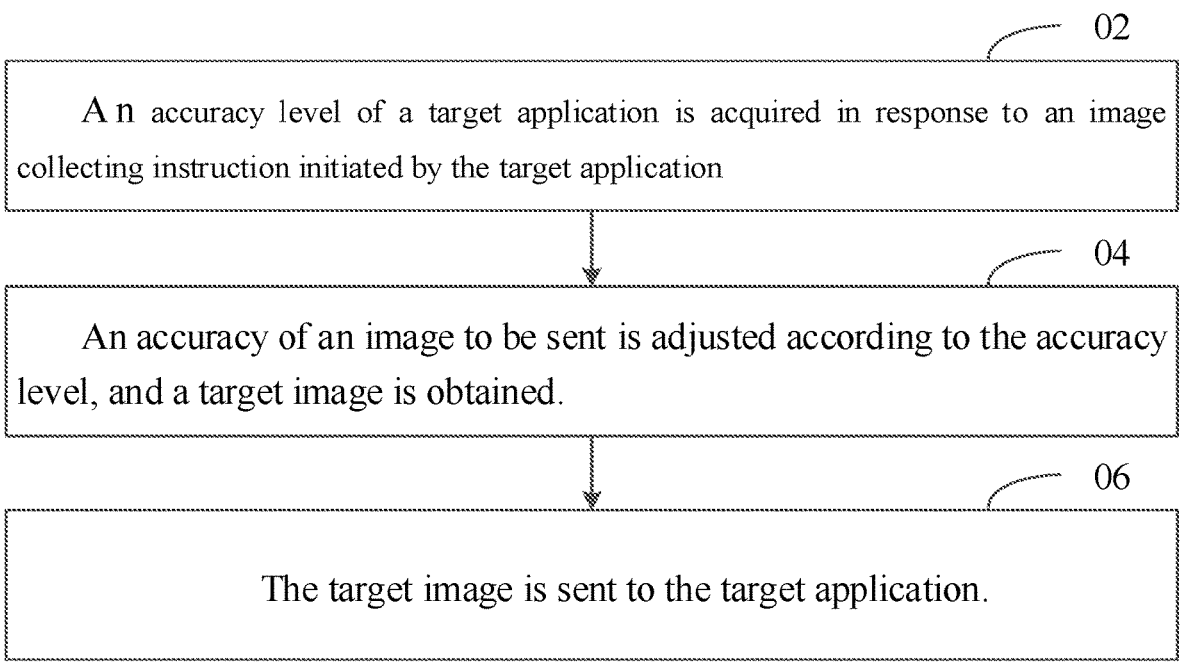
FIG. 1 is a flowchart of an image processing method according to an embodiment.

FIG. 1 is a flowchart of an image processing method according to an embodiment. As illustrated in FIG. 1, the image processing method includes acts in blocks 02 to 06.

At block 02, an accuracy level of a target application is acquired in response to an image collecting instruction initiated by the target application.

At block 04, an accuracy of an image to be sent is adjusted according to the accuracy level, and a target image is obtained.

At block 06, the target image is sent to the target application.

Figure 2:
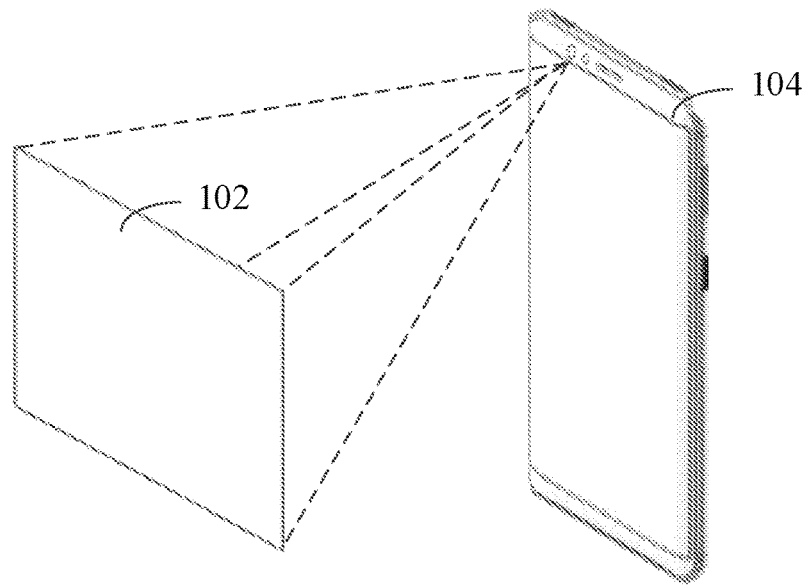
FIG. 2 is a diagram of an application scenario of an image processing method according to an embodiment.

FIG. 2 is a diagram of an application scenario of an image processing method according to an embodiment. As illustrated in FIG. 2, the application scenario includes an electronic device 104. The electronic device 104 may be provided with a camera module, and further, may be provided with several applications. The application may initiate an image collecting instruction for acquiring an image. In response to the electronic device 104 detecting the image collecting instruction, the application may acquire an application level corresponding to the target application initiating the image collecting instruction, and acquire a corresponding accuracy level according to the application level. The number of speckle points included in a collected speckle image 102 is adjusted according to the accuracy level, and a target image is acquired according to the adjusted speckle image. The speckle image 102 is an image formed by irradiating laser speckles collected by a laser camera onto an object. And finally, the target image is sent to the target application. The electronic device 104 may be a smart phone, a tablet computer, a personal digital assistant, a wearable device, and so on.

Figure 3:
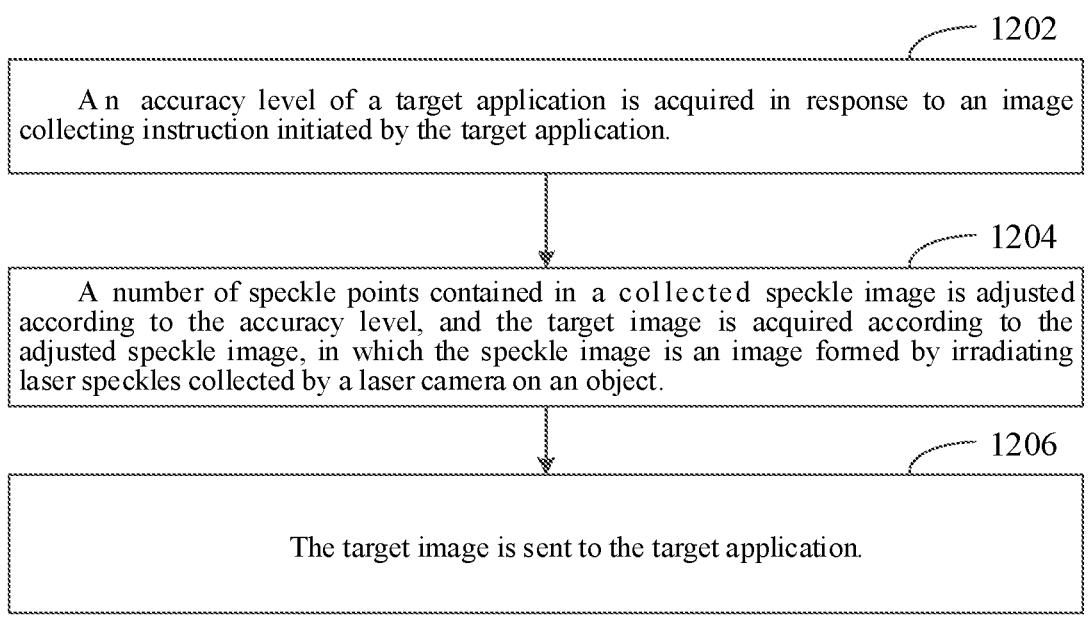
FIG. 3 is a flowchart of an image processing method according to another embodiment.

FIG. 3 is a flowchart of an image processing method according to another embodiment. As illustrated in FIG. 3, the image processing method includes blocks 1202 to 1206.

At block 1202, an accuracy level of a target application is acquired in response to an image collecting instruction initiated by the target application.

Cameras may be mounted on the electronic device and images may be acquired by the mounted cameras. The cameras may be classified into a laser camera, a visible light camera and the like according to the difference of the acquired images. The laser camera may acquire an image formed by irradiating laser on an object, and a visible light image may acquire an image formed by irradiating visible light on the object. A plurality of cameras may be mounted on the electronic device, and installation positions are not limited. For example, one camera may be mounted on a front panel of the electronic device, two cameras may be mounted on a back panel of the electronic device, and the cameras may be mounted inside the electronic device in an embedded manner with the cameras being opened by rotating or sliding. Specifically, a front camera and a rear camera may be mounted on the electronic device, and may acquire images from different viewing angles. Normally, the front camera may acquire images from a front viewing angle of the electronic device, and the rear camera may acquire images from a rear viewing angle of the electronic device.

Several applications may be installed in the electronic device, where the applications refer to software written in the electronic device for a certain application purpose. The electronic device may satisfy a user's demand with the applications. For example, the user may play games with a game application, make a transaction payment with a payment application, play music with a music application, and the like. When an application needs to collect an image, an image collecting instruction is initiated, and the electronic device may, according to the image collecting instruction, call the camera module to acquire the image. The image collecting instruction refers to an instruction for triggering an image collecting operation. For example, when the user wants to shoot, the user may click the shooting button. When it is recognized that the shooting button is pressed, the electronic device generates the image collecting instruction, so as to call the camera module to acquire an image. When the user needs to perform a payment verification with a face, the user may click the payment button and aim the face at the camera for shooting. And then, the electronic device may perform the payment verification after collecting the face.

In response to an application initiating the image collecting instruction, an application identifier for uniquely identifying the application may be written in the image collecting instruction. In response to the electronic device detecting the image collecting instruction, the electronic device may search a corresponding application level according to the application identifier. The application may also directly write the application level into the image collecting instruction. In this manner, the electronic device may directly acquire the application level in the image collecting instruction in response to the image collecting instruction. The application level refers to a level of importance of the application. For example, applications may be divided into four application levels, namely an application with a safe system, an application with an unsafe system, a third-party safe application and a third-party unsafe application, application levels corresponding to which are gradually reduced. A corresponding relation between the application level and the accuracy level may be stored in the electronic device in advance, and thus the accuracy level corresponding to the application level may be acquired.

The act in block 02 may include the act in block 1204.

At block 1204, a number of speckle points contained in a collected speckle image is adjusted according to the accuracy level, and the target image is acquired according to the adjusted speckle image, in which the speckle image is an image formed by irradiating laser speckles collected by a laser camera on an object.

In response to detecting the image collecting instruction, a laser light and the laser camera may be turned on. Laser speckles formed by the laser light may irradiate on the object, and then the speckle image formed by irradiating the laser speckles on the object is acquired through the laser camera. Specifically, when laser light is directed onto an optically rough surface having an average undulation greater than a magnitude of a wavelength, bins scattered wavelets on the surface are superimposed on each other, such that a reflected light field has a random spatial light intensity distribution and presents a grainy structure, which are laser speckles. The formed laser speckles include several laser speckle points, and thus the speckle image acquired by the laser camera also include several speckle points. For example, the speckle image may include 30,000 speckle points. The formed laser speckles have a high randomness, and thus the laser speckles generated by the laser light emitted by different laser emitters are different. Speckle images generated are not identical when the formed laser speckles are illuminated onto objects with different depths and in different shapes. The laser speckles formed by different laser emitters are unique and thus the obtained speckle images are also unique.

Specifically, a CPU (central processing unit) in the electronic device may receive an instruction from an upper-layer application. In response to the CPU receiving the image collecting instruction, the camera module may be controlled to acquire an infrared image and the speckle image. The camera module may include, but is not limited to, a laser camera, a laser light and a floodlight. The CPU may control the laser light and the floodlight to work in a time-sharing manner. In response to the laser light being turned on, the laser camera is operated to collect speckle images; and in response to the floodlight being turned on, the laser camera is operated to collect infrared images.

The electronic device may calculate depth information from the object to the camera according to the collected speckle image. The more the speckle points contained in the speckle image are, the more accurate the calculated depth information is. The laser light may emit several laser speckle points, and when the laser speckle points irradiate objects at different distances, positions of the speckles presented on the image are different. The electronic device may pre-capture a standard reference image that is formed by the laser speckles irradiating on a plane, so that the speckle points on the reference image are generally uniformly distributed; and then, a corresponding relation between each speckle point in the reference image and reference depth is established. When the speckle image needs to be collected, the laser light is controlled to emit laser speckles, and after the laser speckles irradiate the object, the speckle image is collected through the laser camera. After that, each speckle point in the speckle image is compared with the speckle point in the reference image to acquire a position offset of the speckle point in the speckle image relative to the corresponding speckle point in the reference image, and an actual depth information corresponding to each speckle point is acquired according to the position offset of the speckle point and the reference depth.

The infrared image collected by the camera corresponds to the speckle image, and the speckle image may be configured to calculate depth information corresponding to each pixel point in the infrared image. Therefore, a face may be detected and identified through the infrared image, and depth information corresponding to the face may be calculated according to the speckle image. Specifically, in the process of calculating the depth information according to the speckle image, first a relative depth is calculated according to the position offset of the speckle image relative to the speckle points in the reference image, in which the relative depth may represent the depth information from the actually shot object to a reference plane; and then, the actual depth information of the object is calculated according to the acquired relative depth and the reference depth. The depth image, configured to represent the depth information corresponding to the infrared image, may be a relative depth from the object to the reference plane, or an absolute depth from the object to the camera.

The number of the speckle points contained in the speckle image is adjusted according to the accuracy level, and the adjustment may be performed in a software mode or a hardware mode. When the adjustment is performed in the software mode, the speckle points in the collected speckle image may be directly detected, and part of the speckle points are combined or eliminated, so that the number of the speckle points contained in the adjusted speckle image is reduced. When the adjustment is performed in the hardware mode, the number of the laser speckle points generated by diffraction of the laser light may be adjusted. For example, the speckle points contained in the speckle image may be adjusted from 30,000 to 20,000, so that the accuracy of the depth image calculated accordingly is reduced. After the electronic device adjusts the number of the speckle points contained in the speckle image according to the accuracy level, the electronic device acquires the target image according to the adjusted speckle image. The target image may be an adjusted speckle image, or may be a depth image obtained through calculation according to the adjusted speckle image.

At block 1206, the target image is sent to the target application.

After the target image is acquired, the corresponding target application may be searched according to the application identifier, and the target image is sent to the target application. The target application may perform application operations such as payment, unlocking, facial beautification and AR (augmented reality) according to the target image.

As data (e.g., an image) is generally transmitted over a common data transmission channel, it is extremely vulnerable to interception during transmission. Once the data is leaked, great potential safety hazard emerges. According to the image processing method provided by the embodiment, an accuracy level of a target application may be acquired in response to an image collecting instruction initiated by the target application, and the corresponding accuracy level may be acquired according to the application level. And then, the number of the speckle points contained in the collected speckle image is adjusted according to the accuracy level, and the target image is acquired according to the adjusted speckle image. And finally, the target image is sent to the target application. Therefore, target images with different accuracy levels may be sent to different target applications. Target applications with low application levels obtain target images with low accuracy levels, and thus the safety of the sent target images may be guaranteed.

Figure 4:
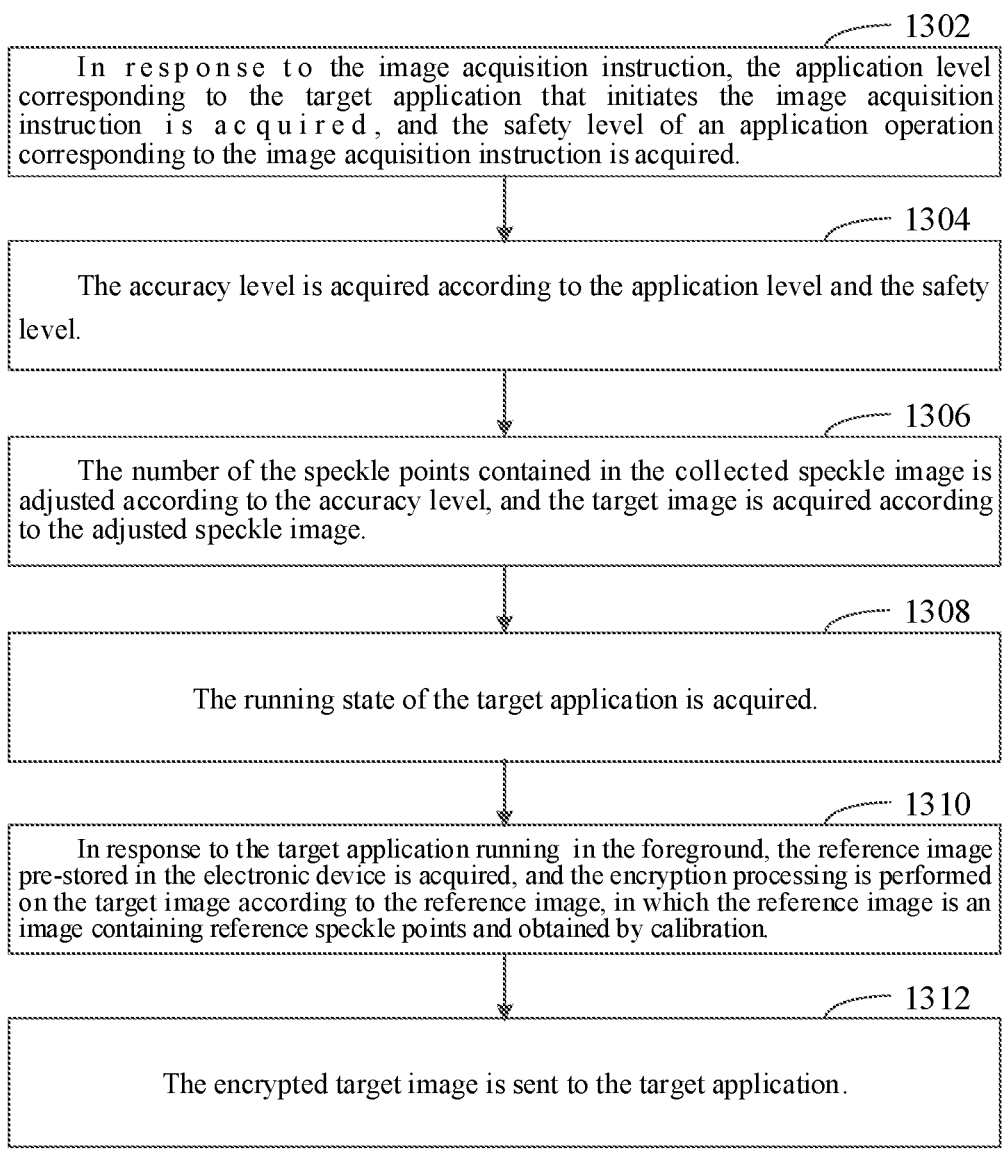
FIG. 4 is a flowchart of an image processing method according to another embodiment.

FIG. 4 is a flowchart of an image processing method according to another embodiment. As illustrated in FIG. 4, the image processing method includes acts in blocks 1302 to 1310.

At block 1302, an accuracy level of a target application is acquired in response to an image collecting instruction initiated by the target application, and the safety level of an application operation corresponding to the image collecting instruction is acquired.

The application operation refers to an operation that needs to be completed by an application. After the user opens the application, different application operations may be completed by the application. For example, the application operation may be a payment operation, a shooting operation, an unlocking operation, a game operation, or the like. The safety level of the application operation refers to a level of a safety requirement of the application operation. For example, since the payment operation has a high safety requirement on data processing, the safety level corresponding to the payment operation is high; and since the shooting operation has a low safety requirement on data processing, the safety level corresponding to the shooting operation is low.

Specifically, in response to the application initiating the image collecting instruction, an operation identifier may be written in the image collecting instruction, in which the operation identifier is configured to uniquely identify an application operation. For example, the operation identifier corresponding to the payment operation is "pay", and the operation identifier corresponding to the shooting operation is "photo". The electronic device may acquire the corresponding application level according to the application identifier contained in the image collecting instruction and acquire the corresponding safety level according to the operation identifier.

At block 1304, the accuracy level is acquired according to the application level and the safety level.

In one embodiment, the accuracy level is acquired according to the application level of the target application and the safety level of the application operation. The higher the application level of the target application, the higher the safety level of the application operation and the higher the corresponding accuracy level. Specifically, the application may be divided into several application levels, and each application level corresponds to a first accuracy weight. Similarity, the application operation may also be divided into several safety levels, and each safety level corresponds to a second accuracy weight. After the application level and the safety level of the target application are acquired, the first accuracy weight corresponding to the application level and the second accuracy weight corresponding to the safety level may be acquired. An accuracy weight is calculated according to the first accuracy weight and the second accuracy weight, and then the accuracy level in which the accuracy weight falls is determined.

For example, the application levels of the application may be divided into five levels, and the first accuracy weights corresponding to the application levels from low to high are 0.2, 0.4, 0.6, 0.8 and 1, respectively. The application operations are divided into four safety levels, and the second accuracy weights corresponding to the safety levels from low to high are 0.25, 0.5, 0.75 and 1, respectively. The accuracy levels may be divided into three levels, and the accuracy weights corresponding to the accuracy levels from low to high are 0-0.4, 0.4-0.8 and 0.8-1, respectively. A formula for calculating the accuracy weight (D) according to the first accuracy weight (a) and the second accuracy weight (b) is as follows: D=0.5*a+0.5*b. Assuming that the application level of the target application is 3 and the safety level of the corresponding application operation is 2, the obtained first accuracy weight is 0.6 and the obtained second accuracy weight is 0.5. Consequently, the accuracy weight is 0.5*0.6+0.5*0.5=0.55, and the corresponding accuracy level is 2.

At block 1306, the number of the speckle points contained in the collected speckle image is adjusted according to the accuracy level, and the target image is acquired according to the adjusted speckle image.

The electronic device may include a first processing unit, the camera module and a second processing unit. The first processing unit operates under a first safety environment, and the second processing unit operates under a second safety environment. The first processing unit is connected to both the camera module and the second processing unit, and the camera module is connected to the second processing unit. The image collecting instruction initiated by the application may be sent to the first processing unit. After the first processing unit detects the image collecting instruction, the first processing unit may control the camera module to collect the speckle image according to the image collecting instruction, and sends the collected speckle image to the second processing unit. The second processing unit may calculate a parallax image according to the speckle image, and send the speckle image and the parallax image to the first processing unit. And then, the first processing unit corrects the speckle image according to the parallax image, acquires the target image according to a corrected speckle image, and sends the target image to the target application.

Specifically, the camera module may include, but is not limited to, the laser camera, the laser light, and the floodlight. In response to the first processing unit receiving the image collecting instruction, the first processing unit may control the laser light and the floodlight to work in the time-sharing mode. When the laser light is turned on, the speckle image is collected through the laser camera; and when the floodlight is turned on, the infrared image is collected through the laser camera. The parallax image is configured to represent errors generated in the image acquisition process and may include an infrared parallax image and a speckle parallax image, wherein the infrared parallax image is configured to correct the infrared image, and the speckle parallax image is configured to correct the speckle image. For example, when the laser camera generates a deflection, the speckle image acquired needs to correct an error generated by the deflection to obtain a standard speckle image.

It may be understood that the infrared image and the speckle image acquired by the camera correspond to each other, and the depth information corresponding to the infrared image may be calculated according to the speckle image. When the camera collects the infrared image and the speckle image in the time-sharing manner, the consistency of the infrared image and the speckle image may be guaranteed only by ensuring that an interval between collecting the infrared image and the speckle image is short. That is, an interval between the first time point at which the infrared image is collected and the second time point at which the speckle image is collected is less than a first threshold. The first threshold is generally a relatively small value, and may be adjusted according to a change rule of an object to be shot. The faster the change of the object to be shot is, the smaller the first threshold obtained correspondingly is. The first threshold may be set to a large value, assuming that the object to be shot is in a stationary state for a long time. Specifically, a change speed of the object to be shot is obtained, and the corresponding first threshold is obtained according to the change speed.

Specifically, the electronic device may be respectively provided with a floodlight controller and a laser light controller, and the first processing unit is respectively connected with the floodlight controller and the laser light controller through two PWMs (Pulse Width Modulations). When the first processing unit needs to control the floodlight or the laser light to be turned on, a pulse wave may be transmitted to the floodlight controller through the PWM to control the floodlight to be turned on, or the pulse wave may be transmitted to the laser light controller through the PWM to control the laser light to be turned on. The interval between collecting of the infrared image and the speckle image is controlled by transmitting the pulse wave to the two controllers through the PWMs. The interval between the collecting of the infrared image and the speckle image is less than the first threshold, so that the consistency of the collected infrared image and the speckle image may be ensured, a large error between the infrared image and the speckle image is avoided, and the accuracy of image processing is improved.

For example, when the mobile phone needs to be authenticated and unlocked with a face, the user may click an unlocking key to initiate an unlocking instruction, and put the front camera in front of his/her face for capturing. The mobile phone may send the unlocking instruction to the first processing unit, and then the first processing unit controls the camera to work. First, the first camera module collects the infrared image, and then the second camera module is controlled to collect the speckle image after an interval of 1 millisecond, and finally the authentication and unlocking may be performed according to the collected infrared image and the speckle image.

In one embodiment, speckle images of different accuracies are transmitted to different target applications. The method for adjusting the number of the speckle points contained in the speckle images specifically includes: adjusting the number of the speckle points included in laser speckles generated by diffraction of the laser light according to the accuracy level, and collecting the speckle image formed by irradiating the laser speckles on an object through the laser camera; or collecting a preset speckle image formed by irradiating the laser speckles on an object through the laser camera, and adjusting the number of the speckle points contained in the speckle image according to the accuracy level. Different diffractive optical elements (DOEs) may be preset in the laser light, wherein numbers of speckle points formed by diffraction of different DOEs are different. Different DOEs are switched according to the accuracy level to generate the speckle image by diffraction, and depth images with different accuracies are obtained according to the collected speckle images. When the accuracy level is high, the laser light may control a DOE with many speckle points to emit laser speckles, so that a speckle image with many speckle points is acquired; and when the accuracy level is low, the laser light may control a DOE with few speckle points to emit laser speckles, so that a speckle image with few speckle points is acquired.

Specifically, when the number of the speckle points is adjusted through the laser light, the first processing unit may acquire the accuracy level according to the received image collecting instruction, switch different DOEs according to the accuracy level to adjust the number of the speckle points included in the laser speckles generated by diffraction of the laser light, and collect the speckle image formed by the laser speckles irradiated on the object through the laser camera. When the number of the speckle points is adjusted in the software mode, the first processing unit corrects the speckle image according to the parallax image to obtain the corrected speckle image, and then adjusts the number of the speckle points included in the corrected speckle image according to the accuracy level.

The method for acquiring the target image specifically includes: obtaining the depth image through calculation according to the adjusted speckle image, and taking the depth image as the target image; or, taking the adjusted speckle image as the target image. Specifically, the electronic device may calibrate the laser speckle in advance to obtain the reference image, and the reference image is stored in the electronic device. In general, the reference image is formed by irradiating the laser speckles onto the reference plane, in which the reference image is also an image with reference speckle points. Each reference speckle point has corresponding reference depth information. When the depth information of the object to be shot needs to be acquired, the actually collected speckle image may be compared with the reference image, and the actual depth information may be calculated according to the offset of the speckle points in the actually collected speckle image. The method of calculating the depth image specifically includes: acquiring the reference image; obtaining offset information by comparing the reference image with the speckle image, wherein the offset information is configured to represent the horizontal offset of the speckle points in the speckle image relative to the corresponding speckle points in the reference image; and obtaining the depth image through calculation according to the offset information and the reference depth information.

FIG. 5 is a schematic diagram of calculating depth information according to an embodiment. As illustrated in FIG. 5, the laser light 402 may generate the laser speckle points. After the laser speckle points are reflected by an object, the formed image is acquired by the laser camera 404. During a calibration process of the camera, the laser speckle points emitted by the laser light 402 are reflected by a reference plane 408. And then reflected light is collected by the laser camera 404, and imaged by an imaging plane 410 to obtain a reference image. The reference depth from the reference plane 408 to the laser light 402 is L, which is known. In a process of actually calculating the depth information, first the laser speckle points emitted by the laser light 402 are reflected by an object 406, then the reflected light is collected by the laser camera 404, and finally an actual speckle image is obtained by imaging through the imaging plane 410. A formula for calculating the actual depth information is as follows.

$$Dis = \frac{CD \times L \times f}{L \times AB + CD \times f} \qquad \text{Formula (1)}$$

where L is a distance between the laser light 402 and the reference plane 408, f is a focal length of a lens in the laser camera 404, CD is a distance between the laser light 402 and the laser camera 404, and AB is an offset distance between an image of the object 406 and an image of the reference plane 408. AB may be a product of a pixel offset n and an actual distance p of the pixel point. When a distance Dis between the object 404 and the laser light 402 is greater than the distance L between the reference plane 406 and the laser light 402, AB is a negative value; and when the distance Dis between the object 404 and the laser light 402 is less than the distance L between the reference plane 406 and the laser light 402, AB is a positive value.

At block 1308, the reference image pre-stored in the electronic device is acquired, and an encryption processing is performed on the target image according to the reference image.

The target image may be encrypted before being sent to the target application. The reference image is a speckle image collected when the electronic device calibrates the camera module, and the reference images collected by different electronic device are different due to high uniqueness of the reference image. Consequently, the reference image itself may be used as an encryption key for encrypting data. The electronic device may store the reference image in a safe environment, which may prevent data leakage. Specifically, the collected reference image is composed of a two-dimensional pixel matrix, and each pixel point has a corresponding pixel value. The target image may be encrypted according to all or a part of the pixel points in the reference image. For example, the reference image may be directly superimposed on the target image to obtain an encrypted image. Alternatively, a pixel matrix corresponding to the target image and a pixel matrix corresponding to the reference image may be multiplied to obtain the encrypted image. Alternatively, a pixel value corresponding to one or more pixel points in the reference image may be used as the encryption key to encrypt the target image, and the specific encryption algorithm is not limited in this embodiment.

At block 1310, the encrypted target image is sent to the target application.

The reference image is generated during calibration of the electronic device. Consequently, the electronic device may pre-store the reference image in a safe environment. In this manner, when the target image needs to be encrypted, the electronic device may read the reference image in the safe environment and encrypt the target image according to the reference image. Meanwhile, a same reference image is stored in a server corresponding to the target application. After the electronic device sends the encrypted target image to the server corresponding to the target application, the server of the target application acquires the reference image and decrypts the encrypted target image according to the acquired reference image.

It may be understood that the server of the target application may store reference images collected by different electronic devices, and the reference image corresponding to each electronic device is different. Therefore, the server may define a reference image identifier for each reference image, store a device identifier of the electronic device, and then establish a corresponding relationship between the reference image identifier and the device identifier. When the server receives the target image, the received target image may simultaneously carry the device identifier of the electronic device. Consequently, the server may search a corresponding reference image identifier according to the device identifier, find a corresponding reference image according to the reference image identifier, and decrypt the target image according to the found reference image.

In other embodiments provided in the present disclosure, the method for performing the encryption processing according to the reference image may specifically include: acquiring the pixel matrix corresponding to the reference image, and acquiring the encryption key according to the pixel matrix; and performing the encryption processing on the target image according to the encryption key.

Specifically, the reference image is composed of the two-dimensional pixel matrix. Since the acquired reference image is unique, the pixel matrix corresponding to the reference image is also unique. The pixel matrix may be used as the encryption key to encrypt the target image, or certain conversion may be performed on the pixel matrix to obtain the encryption key, and then the encryption processing may be performed on the target image by the encryption key obtained by conversion. For example, the pixel matrix is the two-dimensional matrix composed of a plurality of pixel values, and a position of each pixel value in the pixel matrix may be represented by a two-dimensional coordinate, so that a corresponding pixel value may be acquired by one or more position coordinates, and the acquired one or more pixel values are combined into the encryption key. After the encryption key is acquired, the target image may be encrypted according to the encryption key, and specifically, the encryption algorithm is not limited in this embodiment. For example, the encryption key may be directly superimposed on or multiplied with the target image, or the encryption key may be inserted as a value into the target image, so as to obtain final encrypted target image.

The electronic device may also apply different encryption algorithms to different applications. Specifically, the electronic device may establish a corresponding relationship between an application identifier of the application and the encryption algorithm in advance, and the image collecting instruction may include the target application identifier of the target application. After the image collecting instruction is received, the target application identifier contained in the image collecting instruction may be acquired, a corresponding encryption algorithm is acquired according to the target application identifier, and the target image is encrypted according to the acquired encryption algorithm.

Referring to FIG. 6, in an embodiment, when the encryption processing is performed on the target image, different degrees of encryption processing may be performed according to a time period for initiating the image collecting instruction.

At block 1502, a time stamp contained in the image collecting instruction is acquired, in which the time stamp is configured to represent a time point of initiating the image collecting instruction.

In response to the target application initiating the image collecting instruction, the time stamp is written in the image collecting instruction. The time stamp may represent the time point when the image collecting instruction is initiated, and the time length of initiating the image collecting instruction may be determined according to the time stamp. For example, in response to the target application initiating the image collecting instruction, the target application may initiate the image collecting instruction at "11:23:01 on Feb. 12, 2015", and then write the time point to the image collecting instruction as a time stamp.

At block 1504, an encryption level is acquired according to an interval between the time stamp and a current time point, and an encryption processing corresponding to the encryption level is performed on the target image according to the reference image.

In response to the first processing unit in the electronic device sending the target image, the time stamp included in the image collecting instruction may be acquired, and the current time point may be acquired. The encryption level is acquired according to the interval between the time stamp and the current time point, and the encryption processing corresponding to the encryption level is performed on the target image according to the reference image. The longer the interval between the time stamp and the current time point is, the less safe the target image is, and the higher the encryption level of the corresponding encryption processing is. Specifically, when the interval exceeds the interval threshold, the current response is considered to be overtime, and thus the target image is simply discarded without being sent to the target application any more. And when the interval is smaller than the interval threshold, the target image is sent to the target application. The block 1504 may specifically include: when the interval between the time stamp and the current time point is less than the interval threshold, acquiring the encryption level according to the interval, and performing encryption processing corresponding to the encryption level on the target image according to the reference image.

Figure 7:
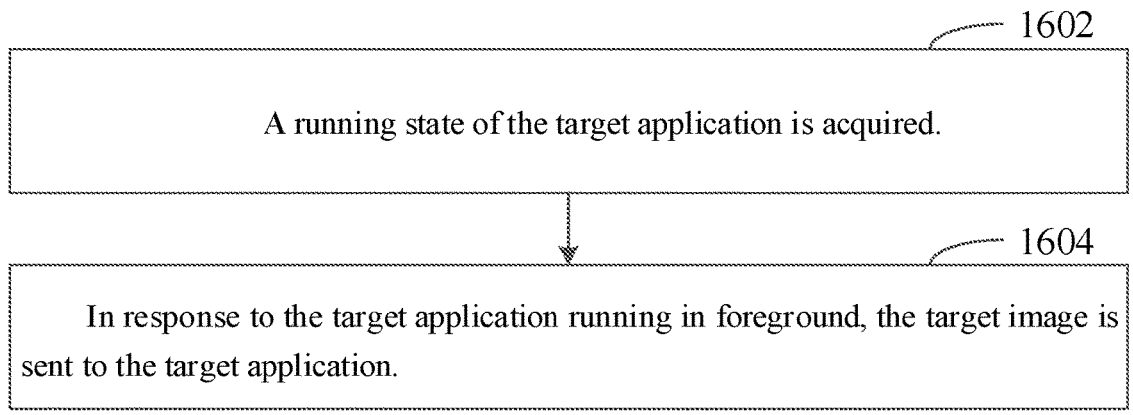
FIG. 7 is a flowchart of an image processing method according to yet another embodiment.

Referring to FIG. 7, in an embodiment, steps of sending the target image by the image processing method may further include the followings.

At block 1602, a running state of the target application is acquired.

At block 1604, in response to the target application running in foreground, the target image is sent to the target application.

In response to the electronic device running an application, the running state of the application may be divided into foreground running and background running. Applications running in the foreground may interact with the user, and applications running in the background generally cannot interact with the user. Before the target image is sent, the running state of the target application may be determined. In response to the target application running in the background, the background application is considered to illegally call the camera to acquire an image. And in response to the target application running in the foreground, the target image is sent to the target application.

According to the image processing method provided in the above embodiment, in response to the image collecting instruction, the application level corresponding to the target application initiating the image collecting instruction and the safety level of the application operation may be acquired, and the corresponding accuracy level may be acquired according to the safety level of the application level. After that, the number of the speckle points contained in the collected speckle image is adjusted according to the accuracy level, and the target image is acquired according to the adjusted speckle image. And finally, the encryption processing is performed on the target image according to the reference image, and the encrypted target image is sent to the target application. Therefore, target images with different accuracies may be sent to different target applications. Target applications with low application levels may obtain target images with low accuracies, such that the safety of the sent target images may be guaranteed. Meanwhile, in response to sending the target image, the target image is encrypted and then transmitted, thereby further improving the safety of image processing.

Referring again to FIG. 1, the application scenario of the image processing method includes the electronic device 104 provided with the camera module and several applications. The application may initiate the image collecting instruction to acquire an image. In response to the electronic device 104 detecting the image collecting instruction, an image to be sent 102 may be acquired according to the image collecting instruction. And then, the application level corresponding to the target application initiating the image collecting instruction is acquired, and the corresponding accuracy level is acquired according to the application level. After that, the acquired image to be sent 102 is adjusted according to the accuracy level to obtain the target image. Finally, the target image is sent to the target application. The electronic device 104 may be a smart phone, a tablet computer, a personal digital assistant, a wearable device, and so on.

Figure 8:
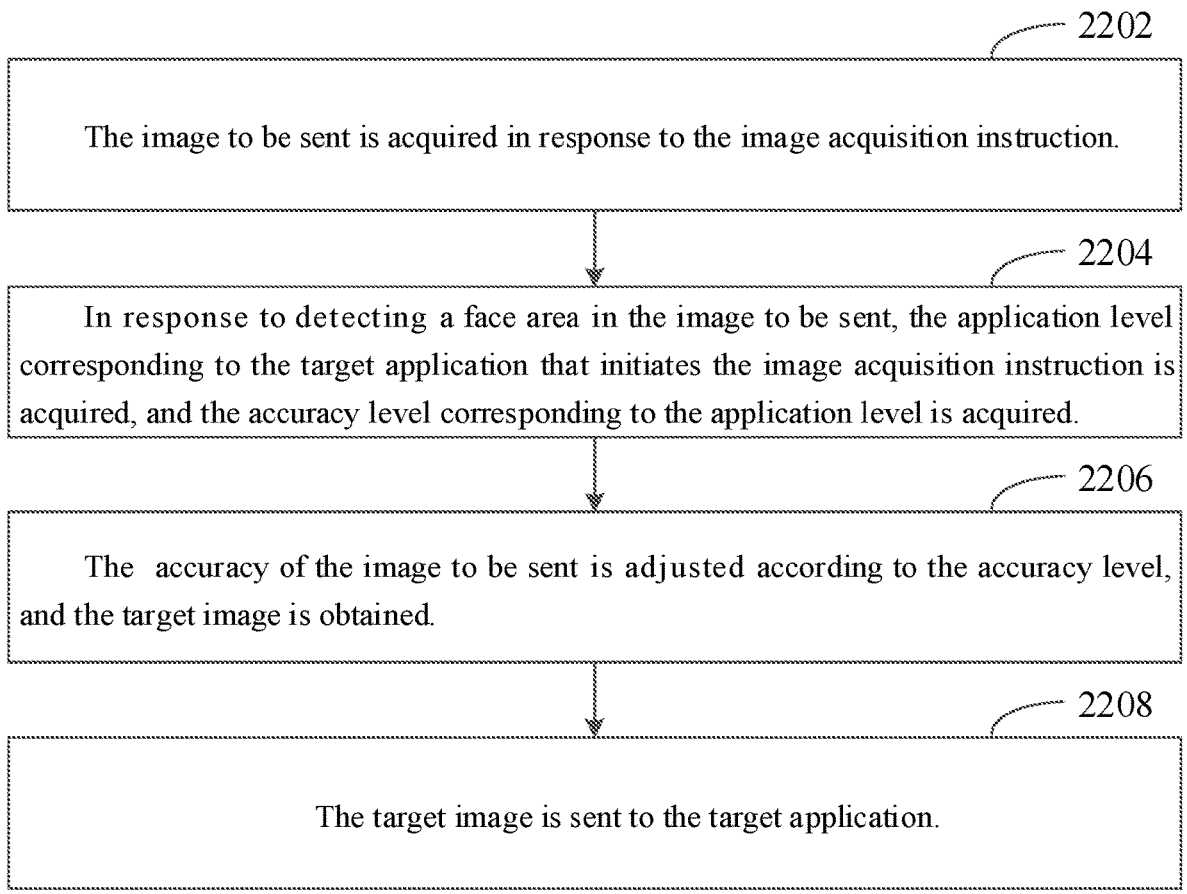
FIG. 8 is a flowchart of an image processing method according to yet another embodiment.

FIG. 8 is a flowchart of an image processing method according to another embodiment. As illustrated in FIG. 8, the image processing method includes blocks 2202 to 2208. The acts in block 02 may include acts in blocks 2202 to 2204.

At block 2202, the image to be sent is acquired in response to the image collecting instruction.

Cameras may be mounted on the electronic device and images may be acquired by the mounted cameras. The cameras may be classified into the laser camera, the visible light camera and the like according to the difference of the acquired images. The laser camera may acquire an image formed by irradiating laser on an object, and the visible light image may acquire an image formed by irradiating visible light on the object. A plurality of cameras may be mounted on the electronic device, and installation positions are not limited. For example, one camera may be mounted on the front panel of the electronic device, two cameras may be mounted on the back panel of the electronic device, and the cameras may be mounted inside the electronic device in an embedded manner with the cameras being opened by rotating or sliding. Specifically, the front camera and the rear camera may be mounted on the electronic device, and may acquire images from different viewing angles. Normally, the front camera may acquire images from the front viewing angle of the electronic device, and the rear camera may acquire images from the rear viewing angle of the electronic device.

Several applications may be installed in the electronic device, where the applications refer to software written in the electronic device for a certain application purpose. The electronic device may satisfy a user's demand with the applications. For example, the user may play games with a game application, make a transaction payment with a payment application, play music with a music application, and the like. When an application needs to acquire an image, an image collecting instruction is initiated, and the electronic device may acquire the image according to the image collecting instruction. The image collecting instruction refers to an instruction for triggering an image collecting operation. For example, when the user wants to shoot, the user may click the shooting button. When it is recognized that the shooting button is pressed, the electronic device generates the image collecting instruction, so as to call the camera module to collect an image. When the user needs to perform a payment verification with a face, the user may click the payment button and aim the face at the camera for shooting. And then, the electronic device may perform the payment verification after obtaining the face. It may be understood that the image to be sent acquired by the electronic device according to the image collecting instruction may be an image acquired in real time, or an image pre-stored in the electronic device.

At block 2204, in response to a face area being detected in the image to be sent, the application level corresponding to the target application that initiates the image collecting instruction is acquired, and the accuracy level corresponding to the application level is acquired.

The face area refers to pixel points corresponding to the face in the image to be sent. The face area may be obtained by performing face detection according to the image to be sent, or may be obtained by performing the face detection according to other corresponding images. For example, when the image to be sent is a RGB (Red Green Blue) image, the face detection may be performed on the RGB image according to a face detection algorithm, and a face area in the RGB image may be identified. The electronic device may also control the camera to simultaneously collect the speckle image and the infrared image, and the depth image may be obtained by calculation according to the speckle image. The acquired depth image corresponds to the infrared image. The depth image does not carry detail information, so that the face detection cannot be performed according to the depth image. Instead, the face detection may be performed according to the infrared image. The face area in the infrared image corresponds to the face area in the depth image, so that whether a face area is contained in the depth image may be detected according to the infrared image.

In response to an application initiating the image collecting instruction, the application identifier for uniquely identifying the application may be written in the image collecting instruction. In response to the electronic device detecting the image collecting instruction, the electronic device may search a corresponding application level according to the application identifier. The application may also directly write the application level into the image collecting instruction. In this manner, the electronic device may directly acquire the application level in the image collecting instruction in response to detecting the image collecting instruction. The application level refers to a level of importance of the application. For example, applications may be divided into four application levels, namely an application with a safe system, an application with an unsafe system, a third-party safe application and a third-party unsafe application, application levels corresponding to which are gradually reduced. A corresponding relation between the application level and the accuracy level may be stored in the electronic device in advance, and thus the accuracy level corresponding to the application level may be acquired.

At block 2206, the accuracy of the image to be sent is adjusted according to the accuracy level, and the target image is obtained.

The accuracy of an image refers to the amount of information contained in the image. Generally, the higher the accuracy level is, the more information the image contains; and the lower the accuracy level is, the less information the image contains. For example, the accuracy of an image may be expressed as a resolution of the image. The higher the resolution, the sharper the image; and the lower the resolution, the more blur the image. The accuracy of an image may also be expressed as a size of the image. Images with larger sizes contain more information while images with smaller sizes contain less information.

For example, assuming that the electronic device collects an image with a resolution of 640*320, in response to a system application initiating the image collecting instruction, the electronic device may directly send the collected image with the resolution of 640*320 to the system application. In response to a third-party application initiating the image collecting instruction, the electronic device may compress the collected image with the resolution of 640*320 into an image with a resolution of 320*160, and send the image with the resolution of 320*160 to the third-party application.

At block 2208, the target image is sent to the target application.

After the target image is acquired, the corresponding target application may be searched according to the application identifier, and the target image is sent to the target application. The target application may perform application operations such as payment, unlocking, facial beautification and AR according to the target image. Generally, the lower the accuracy of the target image, the lower an accuracy of a corresponding processing to be performed. For example, when face recognition is performed according to the target application, the target image with a low resolution has a low recognition accuracy correspondingly.

According to the image processing method provided in the above embodiment, the image to be sent may be acquired in response to the image collecting instruction. When it is detected that the face area exists in the image to be sent, the application level corresponding to the target application initiating the image collecting instruction may be acquired, and the corresponding accuracy level may be acquired according to the application level. And the accuracy of the image to be sent is adjusted according to the accuracy level to obtain the target image, and finally the target image is sent to the target application. Therefore, target images with different accuracies may be sent to different target applications. A target application with a low application level obtains a target image with a low accuracy, so that the safety of the sent target image may be guaranteed.

FIG. 9 is a flowchart of an image processing method according to another embodiment. As illustrated in FIG. 9, the image processing method includes acts in blocks 2302 to 2314.

At block 2302, the image to be sent is acquired in response to the image collecting instruction.

In response to detecting the image collecting instruction, the electronic device may turn on the laser light and the laser camera. The laser speckles formed by the laser light may irradiate on the object, and then the speckle image formed by irradiating the laser speckles on the object is collected through the laser camera. Specifically, when the laser light is directed onto an optically rough surface having an average undulation greater than a magnitude of a wavelength, bins scattered wavelets on the surface are superimposed on each other, such that a reflected light field has a random spatial light intensity distribution and presents a grainy structure, which are laser speckles. The formed laser speckles include several laser speckle points, and thus the speckle image collected by the laser camera also include several speckle points. For example, the speckle image may include 30,000 speckle points. The formed laser speckles have a high randomness, and thus the laser speckles generated by the laser light emitted by different laser emitters are different. Speckle images generated are not identical when the formed laser speckles are illuminated onto objects with different depths and in different shapes. The laser speckles formed by different laser emitters are unique and thus the obtained speckle images are also unique.

Specifically, the CPU in the electronic device may receive an instruction from an upper-layer application. In response to the CPU receiving the image collecting instruction, the camera module may be controlled to collect the infrared image and the speckle image. The camera module may include, but is not limited to, the laser camera, the laser light and the floodlight. The CPU may control the laser light and the floodlight to work in the time-sharing manner. When the laser light is turned on, the laser camera is operated to collect speckle images; and when the floodlight is turned on, the laser camera is operated to collect infrared images.

The electronic device may calculate the depth information from the object to the camera according to the collected speckle image. The more the speckle points contained in the speckle image, the more accurate the calculated depth information. The laser light may emit several laser speckle points, and when the laser speckle points irradiate objects at different distances, positions of the speckles presented on the image are different. The electronic device may pre-collect a standard reference image that is formed by the laser speckles irradiating on a plane, so that the speckle points on the reference image are generally uniformly distributed; and then, a corresponding relation between each speckle point in the reference image and reference depth is established. When the speckle image needs to be collected, the laser light is controlled to emit laser speckles, and after the laser speckles irradiate the object, the speckle image is collected through the laser camera. After that, each speckle point in the speckle image is compared with the speckle point in the reference image to acquire the position offset of the speckle point in the speckle image relative to the corresponding speckle point in the reference image, and an actual depth information corresponding to each speckle point is acquired according to the position offset of the speckle point and the reference depth.

The infrared image collected by the camera corresponds to the speckle image, and the speckle image may be configured to calculate depth information corresponding to each pixel point in the infrared image. Therefore, a face may be detected and identified through the infrared image, and depth information corresponding to the face may be calculated according to the speckle image. Specifically, in the process of calculating the depth information according to the speckle image, first a relative depth is calculated according to the position offset of the speckle image relative to the speckle points in the reference image, in which the relative depth may represent the depth information from the actually shot object to a reference plane; and then, the actual depth information of the object is calculated according to the acquired relative depth and the reference depth. The depth image, configured to represent the depth information corresponding to the infrared image, may be the relative depth from the object to the reference plane, or the absolute depth from the object to the camera. It may be understood that the image to be sent may be the infrared image, the speckle image or the depth image as described above, or may be the visible light image collected by the visible light camera, which is not limited herein.

The electronic device may include the first processing unit, the camera module and the second processing unit. The first processing unit operates in the first safety environment, the second processing unit operates in the second safety environment, the first processing unit is respectively connected to the camera module and the second processing unit, and the camera module is connected to the second processing unit. The image collecting instruction initiated by the application may be sent to the first processing unit. After the first processing unit detects the image collecting instruction, the first processing unit may control the camera module to collect the speckle image and the infrared image according to the image collecting instruction and send the collected speckle image and infrared image to the second processing unit. The second processing unit may calculate the depth image according to the speckle image, obtain the infrared parallax image according to the infrared image, obtain a depth parallax image according to the depth image, and send the infrared parallax image and the depth parallax image to the first processing unit. And then, the first processing unit corrects the infrared image to obtain a corrected infrared image, and corrects the depth parallax image to obtain a corrected depth image. The first processing unit may use at least one of the corrected infrared image, the speckle image and the corrected depth image as an image to be sent, adjust an accuracy of the image to be sent, and send the adjusted image to be sent to the target application.

Specifically, the camera module may include, but is not limited to, the laser camera, the laser light, and the floodlight. In response to the first processing unit receiving the image collecting instruction, the first processing unit may control the laser light and the floodlight to work in the time-sharing mode. When the laser light is turned on, the speckle image is collected through the laser camera; and when the floodlight is turned on, the infrared image is collected through the laser camera. The parallax image is configured to represent errors generated in the image acquisition process and may include the infrared parallax image and the depth parallax image, wherein the infrared parallax image is configured to correct the infrared image, and the depth parallax image is configured to correct the depth image. For example, when the laser camera generates a deflection, the acquired infrared image needs to correct an error generated by the deflection to obtain a standard infrared image.

It may be understood that the infrared image and the speckle image collected by the camera correspond to each other, and the depth information corresponding to the infrared image may be calculated according to the speckle image. When the camera collects the infrared image and the speckle image in the time-sharing manner, the consistency of the infrared image and the speckle image may be guaranteed only by ensuring that an interval between collecting the infrared image and the speckle image is short. That is, the interval between the first time point at which the infrared image is collected and the second time point at which the speckle image is collected is less than the first threshold. The first threshold is generally a relatively small value, and may be adjusted according to a change rule of an object to be shot. The faster the change of the object to be shot is, the smaller the first threshold acquired correspondingly is. The first threshold may be set to a large value, assuming that the object to be shot is in a stationary state for a long time. Specifically, a change speed of the object to be shot is acquired, and the corresponding first threshold is acquired according to the change speed.

Specifically, the electronic device may be respectively provided with the floodlight controller and the laser light controller, and the first processing unit is respectively connected with the floodlight controller and the laser light controller through two PWMs. When the first processing unit needs to control the floodlight or the laser light to be turned on, a pulse wave may be transmitted to the floodlight controller through the PWM to control the floodlight to be turned on, or the pulse wave may be transmitted to the laser light controller through the PWM to control the laser light to be turned on. The interval between collecting of the infrared image and the speckle image is controlled by transmitting the pulse wave to the two controllers through the PWMs. The interval between the collecting of the infrared image and the speckle image is less than the first threshold, so that the consistency of the collected infrared image and the speckle image may be ensured, a large error between the infrared image and the speckle image is avoided, and the accuracy of image processing is improved.

For example, when the mobile phone needs to be authenticated and unlocked with a face, the user may click the unlocking key to initiate the unlocking instruction, and put the front camera in front of his/her face for capturing. The mobile phone may send the unlocking instruction to the first processing unit, and then the first processing unit controls the camera to work. First, the first camera module collects the infrared image, and then the second camera module is controlled to collect the speckle image after an interval of 1 millisecond, and finally the authentication and unlocking may be performed according to the collected infrared image and the collected speckle image.

In one embodiment, the electronic device calibrates the laser speckle in advance to obtain the reference image, and the reference image is stored in the electronic device. In general, the reference image is formed by irradiating the laser speckles onto the reference plane, in which the reference image is also an image with reference speckle points. Each reference speckle point has corresponding reference depth information. When the depth information of the object to be shot needs to be acquired, the actually collected speckle image may be compared with the reference image, and the actual depth information may be calculated according to the offset of the speckle points in the actually collected speckle image. The method of calculating the depth image specifically includes: acquiring the reference image; obtaining offset information by comparing the reference image with the speckle image, wherein the offset information is configured to represent the horizontal offset of the speckle points in the speckle image relative to the corresponding speckle points in the reference image; and obtaining the depth image through calculation according to the offset information and the reference depth information.

Referring again to FIG. 5, FIG. 5 is a schematic diagram of calculating depth information according to an embodiment. As illustrated in FIG. 5, the laser light 402 may generate the laser speckle points. After the laser speckle points are reflected by an object, the formed image is acquired by the laser camera 404. During the calibration process of the camera, the laser speckle points emitted by the laser light 402 are reflected by the reference plane 408. And then reflected light is acquired by the laser camera 404, and imaged by an imaging plane 410 to obtain the reference image. The reference depth from the reference plane 408 to the laser light 402 is L, which is known. In the process of actually calculating the depth information, first the laser speckle points emitted by the laser light 402 are reflected by the object 406, then the reflected light is collected by the laser camera 404, and finally the actual speckle image is obtained by imaging through the imaging plane 410. The formula for calculating the actual depth information is as follows.

$$Dis = \frac{CD \times L \times f}{L \times AB + CD \times f} \quad \text{Formula (1)}$$

where L is a distance between the laser light 402 and the reference plane 408, f is a focal length of a lens in the laser camera 404, CD is a distance between the laser light 402 and the laser camera 404, and AB is an offset distance between the image of the object 406 and the image of the reference plane 408. AB may be a product of the pixel offset n and the actual distance p of the pixel point. When a distance Dis between the object 404 and the laser light 402 is greater than the distance L between the reference plane 406 and the laser light 402, AB is a negative value; and when the distance Dis between the object 404 and the laser light 402 is less than the distance L between the reference plane 406 and the laser light 402, AB is a positive value.

At block 2304, in response to detecting a face area in the image to be sent, the application level corresponding to the target application that initiates the image collecting instruction is obtained, and the safety level of the application operation corresponding to the image collecting instruction is acquired.

In one embodiment, after acquiring an image, the electronic device may send the acquired image to the application. The application may perform a corresponding application operation according to the acquired image. When a face area exists in the image to be sent, the image to be sent is considered to contain relatively private information. In response to the image with the face being obtained by malicious applications, the malicious applications may perform some malicious operations with the image with the face, thereby leading to potential safety hazards. Therefore, when a face area is detected to exist in the image to be sent, the accuracy of the image to be sent may be adjusted.

The application operation refers to an operation that needs to be completed by an application. After the user opens the application, different application operations may be completed by the application. For example, the application operation may be a payment operation, a shooting operation, an unlocking operation, a game operation, or the like. The safety level of the application operation refers to a level of a safety requirement of the application operation. For example, since the payment operation has a high safety requirement on data processing, the safety level corresponding to the payment operation is high; and since the shooting operation has a low safety requirement on data processing, the safety level corresponding to the shooting operation is low.

Specifically, in response to the application initiating the image collecting instruction, the operation identifier may be written in the image collecting instruction, in which the operation identifier is configured to uniquely identify an application operation. For example, the operation identifier corresponding to the payment operation is "pay", and the operation identifier corresponding to the shooting operation is "photo". The electronic device may acquire the corresponding application level according to the application identifier contained in the image collecting instruction and acquire the corresponding safety level according to the operation identifier.

And block 2306, the accuracy level is acquired according to the application level and the safety level.

In one embodiment, the accuracy level is acquired according to the application level of the target application and the safety level of the application operation. The higher the application level of the target application, the higher the safety level of the application operation and the higher the corresponding accuracy level. Specifically, the application may be divided into several application levels, and each application level corresponds to the first accuracy weight. Similarity, the application operation may also be divided into several safety levels, and each safety level corresponds to the second accuracy weight. After the application level and the safety level of the target application are acquired, the first accuracy weight corresponding to the application level and the second accuracy weight corresponding to the safety level may be acquired. An accuracy weight is calculated according to the first accuracy weight and the second accuracy weight, and then the accuracy level in which the accuracy weight falls is determined.

For example, the application levels of the application may be divided into five levels, and the first accuracy weights corresponding to the application levels from low to high are 0.2, 0.4, 0.6, 0.8 and 1, respectively. The application operations are divided into four safety levels, and the second accuracy weights corresponding to the safety levels from low to high are 0.25, 0.5, 0.75 and 1, respectively. The accuracy levels may be divided into three levels, and the accuracy weights corresponding to the accuracy levels from low to high are 0-0.4, 0.4-0.8 and 0.8-1, respectively. The formula for calculating the accuracy weight (D) according to the first accuracy weight (a) and the second accuracy weight (b) is as follows: D=0.5*a+0.5*b. Assuming that the application level of the target application is 3 and the safety level of the corresponding application operation is 2, the obtained first accuracy weight is 0.6 and the obtained second accuracy weight is 0.5. Consequently, the accuracy weight is 0.5*0.6+0.5*0.5=0.55, and the corresponding accuracy level is 2.

At block 2308, the accuracy of the image to be sent is adjusted according to the accuracy level, and the target image is obtained.

In one embodiment, adjusting the accuracy of the image to be sent may specifically include: adjusting the resolution of the image to be sent according to the accuracy level, and obtaining the target image; or, clipping the image to be sent according to the accuracy level, and obtaining the target image. Specifically, the resolution of the image to be sent is adjusted according to the accuracy level. For example, the image to be sent may be compressed according to the accuracy level. As the compressed image to be processed has a lower resolution than the original image to be processed, the definition may also be lowered correspondingly.

The image to be sent is clipped according to the accuracy level, namely a non-face area in the image to be sent is clipped. Specifically, the face area in the image to be sent may be identified and a central point of the face area may be determined. After that, the image to be processed may be clipped according to the accuracy level with the central point as a center. For example, the original image size of the image to be processed is 400*400, and the accuracy level may correspond to a degree of image compression, say, a second accuracy level corresponds to compressing the image to one half of the original size, that is, 200*200, so that the face area in the image to be sent may be detected and a central pixel point of the face area is determined. In this manner, the image with the size of 200*200 is cut out as the target image by taking the central pixel point as the center in the image to be sent.

When more than two face areas exist in the image to be sent, the central pixel point of the face area with the largest area may be acquired as a target pixel point, and the target pixel point is taken as the center to perform cutting corresponding to the accuracy level on the image to be processed. The area may be expressed as the number of pixel points contained in the face area. The greater the number of the contained pixel points is, the larger a corresponding area is.

At block 2310, the running state of the target application is acquired.

When the electronic device runs an application, the running state of the application may be divided into the foreground running and the background running. Applications running in the foreground may interact with the user, and applications running in the background generally cannot interact with the user. Before the target image is sent, the running state of the target application may be determined. When the target application runs in the background, the background application is considered to illegally call the camera to collect an image. And when the target application runs in the foreground, the target image is sent to the target application.

At block 2312, in response to the target application running in the foreground, the reference image pre-stored in the electronic device is obtained, and the target image is encrypted according to the reference image, in which the reference image is an image containing reference speckle points and obtained by calibration.

The target image may be encrypted before being sent to the target application. The reference image is a speckle image collected when the electronic device calibrates the camera module, and the reference images collected by different electronic device are different due to high uniqueness of the reference image. Consequently, the reference image itself may be used as an encryption key for encrypting data. The electronic device may store the reference image in a safe environment, which may prevent data leakage. Specifically, the acquired reference image is composed of a two-dimensional pixel matrix, and each pixel point has a corresponding pixel value. The target image may be encrypted according to all or a part of the pixel points in the reference image. For example, the reference image may be directly superimposed on the target image to obtain an encrypted image. Alternatively, a pixel matrix corresponding to the target image and a pixel matrix corresponding to the reference image may be multiplied to obtain the encrypted image. Alternatively, a pixel value corresponding to one or more pixel points in the reference image may be used as the encryption key to encrypt the target image, and the specific encryption algorithm is not limited in this embodiment.

At block 2314, the encrypted target image is sent to the target application.

The reference image is generated during calibration of the electronic device. Consequently, the electronic device may pre-store the reference image in a safe environment. In this manner, when the target image needs to be encrypted, the electronic device may read the reference image in the safe environment and encrypt the target image according to the reference image. Meanwhile, the same reference image is stored in the server corresponding to the target application.

After the electronic device sends the encrypted target image to the server corresponding to the target application, the server of the target application acquires the reference image and decrypts the encrypted target image according to the acquired reference image.

It may be understood that the server of the target application may store reference images collected by different electronic devices, and the reference image corresponding to each electronic device is different. Therefore, the server may define a reference image identifier for each reference image, store a device identifier of the electronic device, and then establish a corresponding relationship between the reference image identifier and the device identifier. When the server receives the target image, the received target image may simultaneously carry the device identifier of the electronic device. Consequently, the server may search a corresponding reference image identifier according to the device identifier, find a corresponding reference image according to the reference image identifier, and decrypt the target image according to the found reference image.

Figure 10:
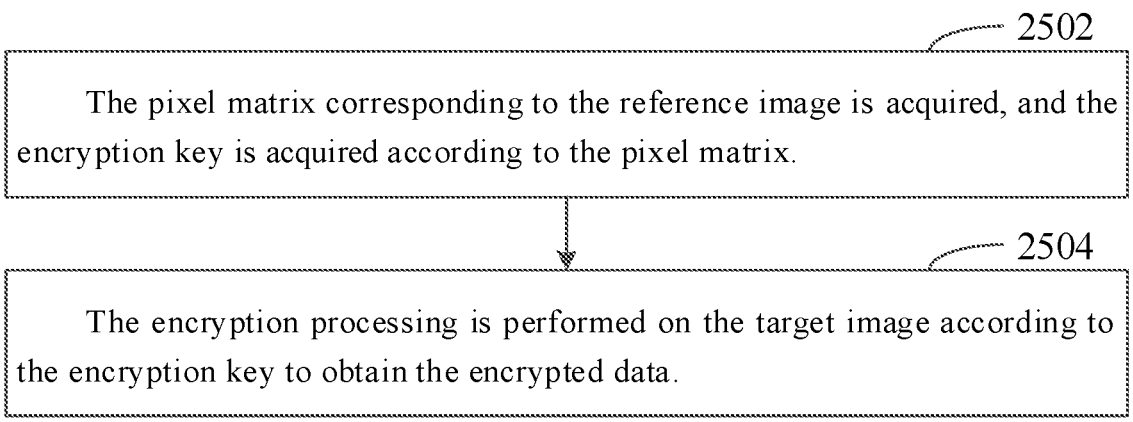
FIG. 10 is a flowchart of an image processing method according to yet another embodiment.

Referring to FIG. 10, in an embodiment, the method of performing the encryption processing according to the reference image may specifically include the followings.

At block 2502, the pixel matrix corresponding to the reference image is acquired, and the encryption key is acquired according to the pixel matrix.

Specifically, the reference image is composed of the two-dimensional pixel matrix. Since the acquired reference image is unique, the pixel matrix corresponding to the reference image is also unique. The pixel matrix may be used as the encryption key to encrypt the target image, or certain conversion may be performed on the pixel matrix to obtain the encryption key, and then the encryption processing may be performed on the target image by the encryption key obtained by conversion. For example, the pixel matrix is the two-dimensional matrix composed of a plurality of pixel values, and a position of each pixel value in the pixel matrix may be represented by a two-dimensional coordinate, so that a corresponding pixel value may be acquired by one or more position coordinates, and the acquired one or more pixel values are combined into the encryption key. After the encryption key is acquired, the target image may be encrypted according to the encryption key, and specifically, the encryption algorithm is not limited in this embodiment. For example, the encryption key may be directly superimposed on or multiplied with the target image, or the encryption key may be inserted as a value into the target image, so as to obtain the final encrypted target image.

At block 2504, the encryption processing is performed on the target image according to the encryption key.

The electronic device may also apply different encryption algorithms to different applications. Specifically, the electronic device may establish a corresponding relationship between an application identifier of the application and the encryption algorithm in advance, and the image collecting instruction may include the target application identifier of the target application. After the image collecting instruction is received, the target application identifier contained in the image collecting instruction may be acquired, a corresponding encryption algorithm is acquired according to the target application identifier, and the target image is encrypted according to the acquired encryption algorithm.

Figure 11:
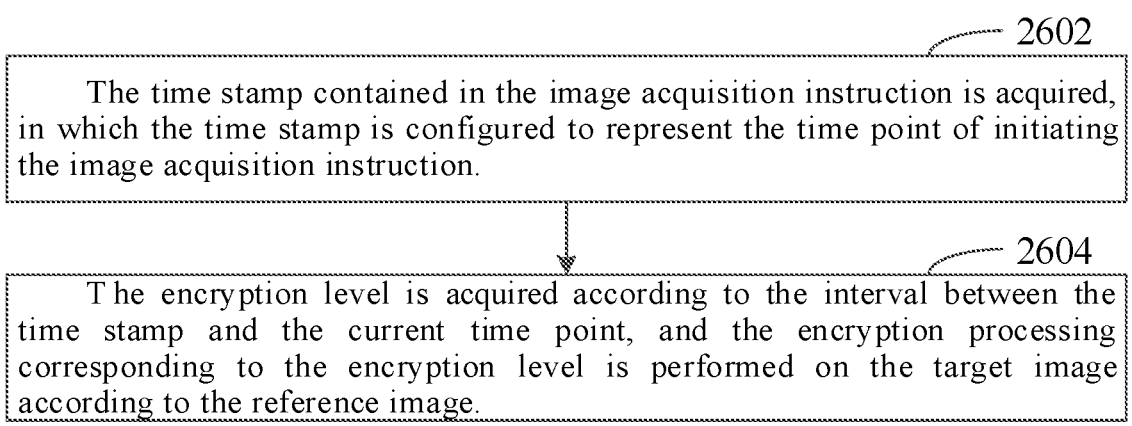
FIG. 11 is a flowchart of an image processing method according to yet another embodiment.

Referring to FIG. 11, in an embodiment, when the encryption processing is performed on the target image, different degrees of encryption processing may be performed according to the time period for initiating the image collecting instruction.

At block 2602, the time stamp contained in the image collecting instruction is acquired, in which the time stamp is configured to represent the time point of initiating the image collecting instruction.

In response to the target application initiating the image collecting instruction, the time stamp is written in the image collecting instruction. The time stamp may represent the time point when the image collecting instruction is initiated, and the time length of initiating the image collecting instruction may be determined according to the time stamp. For example, in response to the target application initiating the image collecting instruction, the target application may initiate the image collecting instruction at "11:23:01 on Feb. 12, 2015", and then write the time point to the image collecting instruction as a time stamp.

At block 2604, the encryption level is acquired according to the interval between the time stamp and the current time point, and the encryption processing corresponding to the encryption level is performed on the target image according to the reference image.

In response to the first processing unit in the electronic device sending the target image, the time stamp included in the image collecting instruction may be acquired, and the current time point may be acquired. The encryption level is acquired according to the interval between the time stamp and the current time point, and the encryption processing corresponding to the encryption level is performed on the target image according to the reference image. The longer the interval between the time stamp and the current time point is, the less safe the target image is, and the higher the encryption level of the corresponding encryption processing is. Specifically, when the interval exceeds the interval threshold, the current response is considered to be overtime, and thus the target image is simply discarded without being sent to the target application any more. And when the interval is smaller than the interval threshold, the target image is sent to the target application. The block 2604 may specifically include: when the interval between the time stamp and the current time point is less than the interval threshold, acquiring the encryption level according to the interval, and performing the encryption processing corresponding to the encryption level on the target image according to the reference image.

According to the image processing method provided in the above embodiments, the image to be sent may be acquired in response to the image collecting instruction. When it is detected that a face area exists in the image to be sent, the application level corresponding to the target application initiating the image collecting instruction and the safety level of the application operation are acquired, and the corresponding accuracy level is acquired according to the application level and the safety level. The accuracy of the image to be sent is adjusted according to the accuracy level to obtain the target image. And finally, the target image is sent to the target application after the encryption processing is performed on the target image. Therefore, target images with different accuracies may be sent to different target applications. Target applications with low application levels may obtain target images with low accuracies, such that the safety of the sent target images may be guaranteed. Before the target image is sent, the target image may be encrypted, thereby further improving the safety of image processing.

It should be understood that although blocks in the flowcharts of FIGS. 1, 3, 4 and 6-11 are illustrated in sequence as indicated by arrows, the blocks are not necessarily performed in the sequence indicated by the arrows. The blocks are not strictly ordered to perform and may be performed in other orders, unless explicitly stated herein. Furthermore, at least a portion of the blocks in FIGS. 1, 3, 4 and 6-11 may include sub-blocks or stages, which are, instead of being necessarily performed at the same time, may be performed at different time points. The order of performing the sub-blocks or stages is not necessarily sequential, and may be performed in turn or alternately with other blocks or with at least a portion of the sub-blocks or stages of the other blocks.

Figure 12:
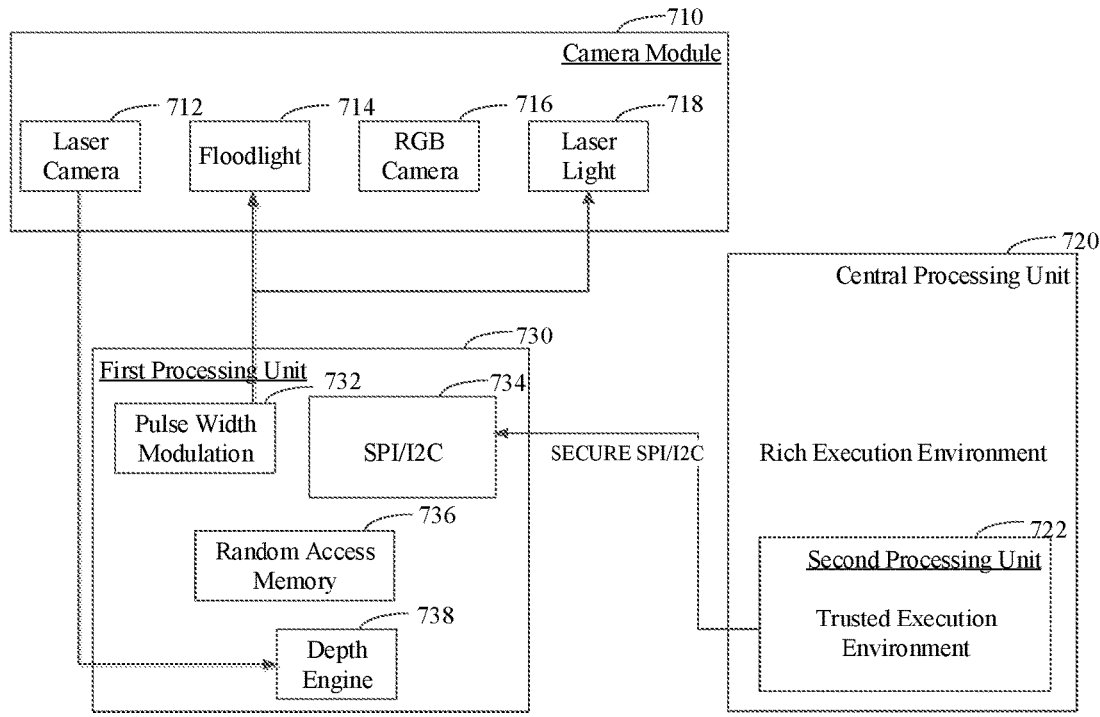
FIG. 12 is a hardware structure diagram of implementing an image processing method according to an embodiment.

FIG. 12 is a hardware structure diagram of implementing an image processing method according to an embodiment. As illustrated in FIG. 12, the electronic device may include a camera module 710, a CPU 720 and a first processing unit 730. The camera module 710 includes a laser camera 712, a floodlight 714, a RGB (Red/Green/Blue) camera 716 and a laser light 718. The first processing unit 730 includes a PWM module 732, a SPI/I2C (Serial Peripheral Interface/Inter-Integrated Circuit) module 734, a RAM (Random Access Memory) module 736, and a Depth Engine module 738. The second processing unit 722 may be a CPU core in trusted execution environment (TEE), and the first processing unit 730 is a MCU processor. It may be understood that the CPU 720 may be in a multi-core mode of operation, and the CPU core in the CPU 720 may be operated under TEE or REE (rich execution environment). Both the TEE and the REE are operation modes of an ARM module (advanced RISC machines). Generally, the operation behavior with a high level of safety in the electronic device needs to be performed under the TEE, and other operation behaviors may be performed under the REE. In the embodiment of the present disclosure, in response to the CPU 720 receiving the image collecting instruction with a high safety requirement initiated by the target application, for example, when the target application needs to perform unlocking or payment with face information, the CPU core running under the TEE, that is, the second processing unit 722, sends the image collecting instruction to the SPI/I2C module 734 in the MCU 730 through SECURE SPI/I2C. The first processing unit 730 sends a pulse wave through the PWM module 732 to control the floodlight 714 in the camera module 710 to be turned on to collect the infrared image and to control the laser light 718 in the camera module 710 to be turned on to collect the speckle image. The camera module 710 may send the collected speckle image to the Depth Engine module 738 in the first processing unit 730. The Depth Engine module 738 may calculate the infrared parallax image according to the infrared image, calculate the speckle parallax image according to the speckle image, and then send the infrared image, the infrared parallax image, the speckle image and the speckle parallax image to the second processing unit 722. The second processing unit 722 corrects the infrared image according to the infrared parallax image to obtain the corrected infrared image, and corrects the speckle image according to the speckle parallax image to obtain the corrected speckle image. After that, the second processing unit 722 may obtain the depth image through calculation according to the corrected speckle image, perform the face recognition according to the corrected infrared image, detect whether a face exists in the corrected infrared image and detect whether the detected face matches with a stored face. In response to the face identification being passed, living-body detection is performed according to the corrected infrared image and the depth image, so as to detect whether the face belongs to a living body. In one embodiment, after the corrected infrared image and the depth image are acquired, the living-body detection may be performed before the face recognition, or the face recognition and the living-body detection may be performed simultaneously. After the face recognition passes and the detected face belongs to a living body, the second processing unit 722 may send one or more of the corrected infrared image, the corrected speckle image, the depth image and the face recognition result to the target application.

Figure 13:
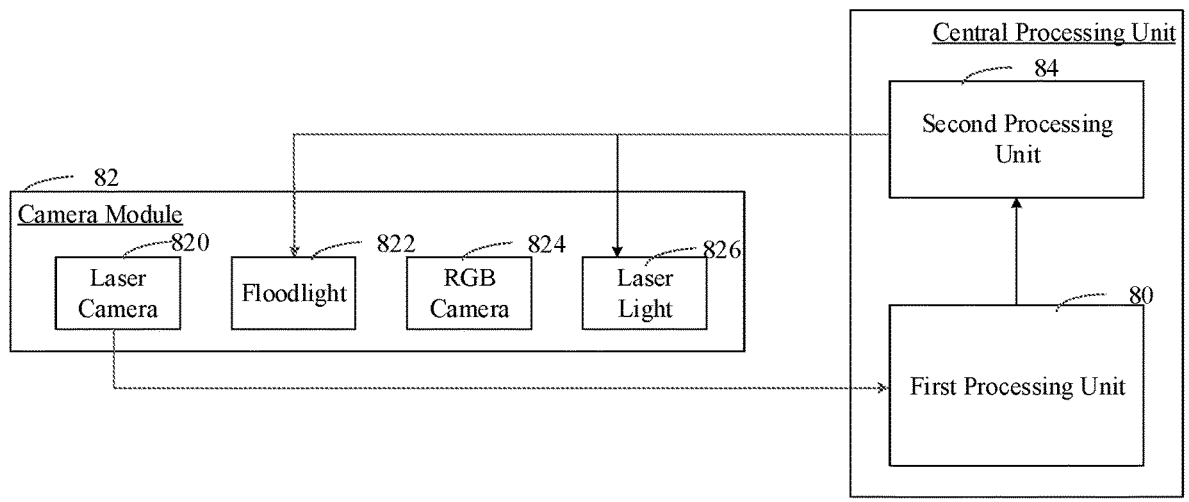
FIG. 13 is a hardware structure diagram of implementing an image processing method according to another embodiment.

FIG. 13 is a hardware structure diagram of implementing an image processing method according to another embodiment. As illustrated in FIG. 13, the hardware structure includes a first processing unit 80, a camera module 82 and a second processing unit 84. The camera module 82 includes a laser camera 820, a floodlight 822, a RGB camera 824 and a laser light 826. The CPU may include the CPU core under the TEE and the CPU core under the REE. The first processing unit 80 is a DSP processing module developed in the CPU, and the second processing unit 84 is the CPU core under the TEE. The second processing unit 84 and the first processing unit 80 may be connected through a secure buffer, so that safety in an image transmission process may be ensured. Normally, when the CPU handles the operation behavior with a high level of safety, the CPU needs to be switched to be executed under the TEE, and the operation behavior with a low level of safety may be executed under the TEE. In the embodiment of the present disclosure, the second processing unit 84 may receive the image collecting instruction sent by the upper application. When the application operation corresponding to the image collecting instruction received by the second processing unit 84 is the safe operation, the pulse wave is transmitted by the PWM module to control the floodlight 822 in the camera module 82 to be turned on to collect the infrared image, and then to control the laser light 826 in the camera module 82 to be turned on to collect the speckle image. The camera module 82 may send the collected infrared image and speckle image to the first processing unit 80, which may obtain the depth image through calculation according to the speckle image, and then the depth parallax image may be obtained through calculation according to the depth image, and the infrared parallax image may be obtained through calculation according to the infrared image. After that, the infrared parallax image and the depth parallax image are sent to the second processing unit 84. The second processing unit 84 may perform correction based on the infrared parallax image to obtain the corrected infrared image, and perform correction based on the depth parallax image to obtain the corrected depth image. The second processing unit 84 performs face authentication according to the infrared image, detects whether a face exists in the corrected infrared image, and detects whether the detected face matches with the stored face. When the face authentication is passed, the living-body detection is performed according to the corrected infrared image and the corrected depth image to determine whether the face belongs to a living body. After the second processing unit 84 performs the face authentication and the living-body detection, the processing result is sent to the target application, which performs the application operations such as unlocking and payment according to the detection result.

Figure 14:
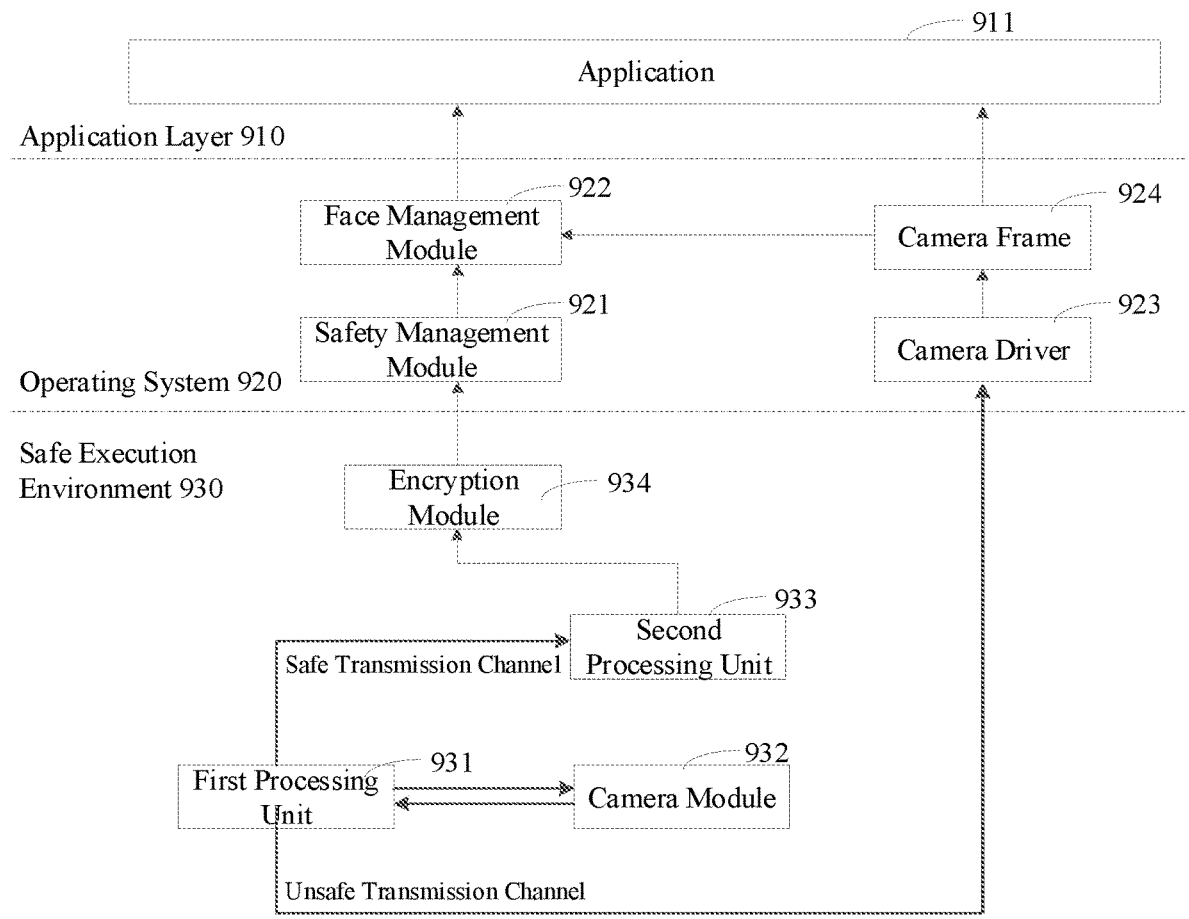
FIG. 14 is a schematic diagram of a software architecture for implementing an image processing method according to an embodiment.

FIG. 14 is a schematic diagram of a software architecture for implementing an image processing method according to an embodiment. As illustrated in FIG. 14, the software architecture includes an application layer 910, an operating system 920, and a safe execution environment 930. Modules in the safe execution environment 930 include a first processing unit 931, a camera module 932, a second processing unit 933, an encryption module 934, and the like. The operating system 930 includes a safety management module 921, a face management module 922, a camera driver 923, and a camera frame 924. The application layer 910 includes an application 911. The application 911 may initiate the image collecting instruction and send the image collecting instruction to the first processing unit 931 for processing. For example, when operations such as payment, unlocking, retouching, AR and the like are performed by collecting a face, the application may initiate an image collecting instruction for collecting a face image. It may be understood that the image instruction initiated by the application 911 may be sent to the second processing unit 933 first, and then sent to the first processing unit 931 by the second processing unit 933.

After receiving the image collecting instruction, the first processing unit 931 controls the camera module 932 to collect the infrared image and the speckle image according to the image collecting instruction when it is determined that the application operation corresponding to the image collecting instruction is the safe operation (such as payment and unlocking). The infrared image and the speckle image collected by the camera module 932 are sent to the first processing unit 931. The first processing unit 931 obtains the depth image including the depth information through calculation according to the speckle image, obtains the depth parallax image through calculation according to the depth image, and obtains the infrared parallax image through calculation according to the infrared image. The depth parallax image and the infrared parallax image are sent to the second processing unit 933 through the safe transmission channel. The second processing unit 933 performs correction according to the infrared parallax image to obtain the corrected infrared image, and performs correction according to the depth parallax image to obtain the corrected depth image. And then, the face authentication is performed according to the corrected infrared image, it is detected whether a face exists in the corrected infrared image and whether the detected face is matched with the stored face. When the face authentication is passed, the living-body detection is performed according to the corrected infrared image and the corrected depth image, and it is determined whether the face belongs to a living body. The face recognition result obtained by the second processing unit 933 may be sent to the encryption module 934, and after being encrypted by the encryption module 934, the encrypted face recognition result is sent to the safety management module 921. Generally, different applications 911 have corresponding safety management modules 921. The safety management module 921 will decrypt the encrypted face recognition result and send the face recognition result obtained after decryption to a corresponding face management module 922. The face management module 922 sends the face recognition result to an upper application 911, which performs corresponding operations according to the face recognition result.

When the application operation corresponding to the image collecting instruction received by the first processing unit 931 is the unsafe operation (e.g., retouching or AR), the first processing unit 931 may control the camera module 932 to collect the speckle image, calculate the depth image according to the speckle image, and obtain the depth parallax image according to the depth image. The first processing unit 931 sends the depth parallax image to the camera driver 923 through the unsafe transmission channel. The camera driver 923 performs correction according to the depth parallax image to obtain the corrected depth image, and then sends the corrected depth image to the camera frame 924, which sends the corrected depth image to the face management module 922 or the application 911.

Figure 15:
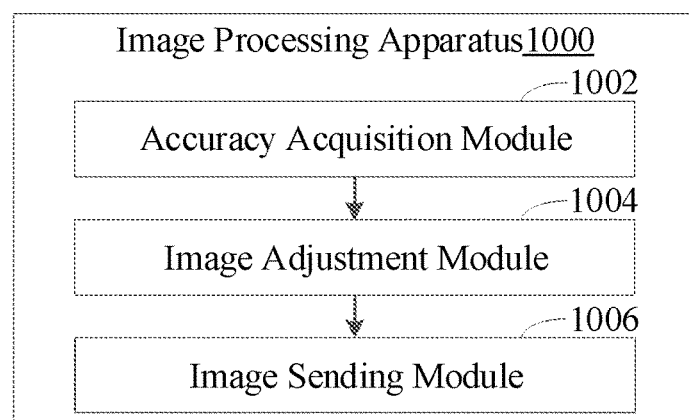
FIG. 15 is a schematic diagram of an image processing apparatus according to an embodiment.

FIG. 15 is a schematic diagram of an image processing apparatus according to an embodiment. As illustrated in FIG. 15, an image processing apparatus 1000 includes an accuracy acquisition module 1002, an image adjustment module 1004 and an image sending module 1006.

The accuracy acquisition module 1002 is configured to acquire an accuracy level of a target application in response to an image collecting instruction initiated by the target application.

The image adjustment module 1004 is configured adjust an accuracy of the image to be sent according to the accuracy level, and to obtain the target image.

The image sending module 1006 is configured to send the target image to the target application.

Referring again to FIG. 15, FIG. 15 is a schematic diagram of an image processing apparatus according to an embodiment. As illustrated in FIG. 15, the image processing apparatus 1000 includes the accuracy acquisition module 1002, the image adjustment module 1004 and the image sending module 1006.

The accuracy acquisition module 1002 is configured to acquire an accuracy level of a target application in response to an image collecting instruction initiated by the target application.

The image adjustment module 1004 is configured to adjust a number of speckle points contained in a collected speckle image according to the accuracy level, and to acquire the target image according to the adjusted speckle image, in which the speckle image is an image formed by irradiating laser speckles acquired by the laser camera on an object.

The image sending module 1006 is configured to send the target image to the target application.

The image processing apparatus according to the above embodiment may acquire an accuracy level of a target application in response to an image collecting instruction initiated by the target application. And then the number of the speckle points contained in the collected speckle image is adjusted according to the accuracy level, and the target image is acquired according to the adjusted speckle image. Finally, the target image is sent to the target application. Therefore, target images with different accuracy levels may be sent to different target applications. Target applications with low application levels obtain target images with low accuracy levels, and thus the safety of the sent target images may be guaranteed.

In an embodiment, the accuracy acquisition module 1002 is further configured to acquire the application level corresponding to the target application that initiates the image collecting instruction, and to acquire the safety level of the application operation corresponding to the image collecting instruction; and to acquire the accuracy level according to the application level and the safety level.

In an embodiment, the image adjustment module 1004 is further configured to adjust the number of the speckle points contained in the laser speckles generated by diffraction of the laser light according to the accuracy level, and to collect the speckle image formed by irradiating the laser speckles on the object through the laser camera; or, to acquire the speckle image formed by irradiating preset laser speckles on the object through the laser camera, and adjusting the number of speckle points contained in the speckle image according to the accuracy level.

In an embodiment, the image adjustment module 1004 is further configured to obtain the depth image through calculation according to the adjusted speckle image, and to take the depth image as the target image; or to take the adjusted speckle image as the target image.

In an embodiment, the image adjustment module 1004 is further configured to acquire the running state of the target application; and send the target image to the target application in response to the target application running in the foreground.

In an embodiment, the image adjustment module 1004 is further configured to acquire the reference image pre-stored in an electronic device, and to perform the encryption processing on the target image according to the reference image, in which the reference image is an image containing reference speckle points and obtained by calibration; and to send the encrypted target image to the target application.

In an embodiment, the image adjustment module 1004 is further configured to acquire the time stamp contained in the image collecting instruction, in which the time stamp is configured to represent the time point of initiating the image collecting instruction; and to acquire the encryption level according to the interval between the time stamp and the current time point, and to perform the encryption processing corresponding to the encryption level on the target image according to the reference image.

Figure 16:
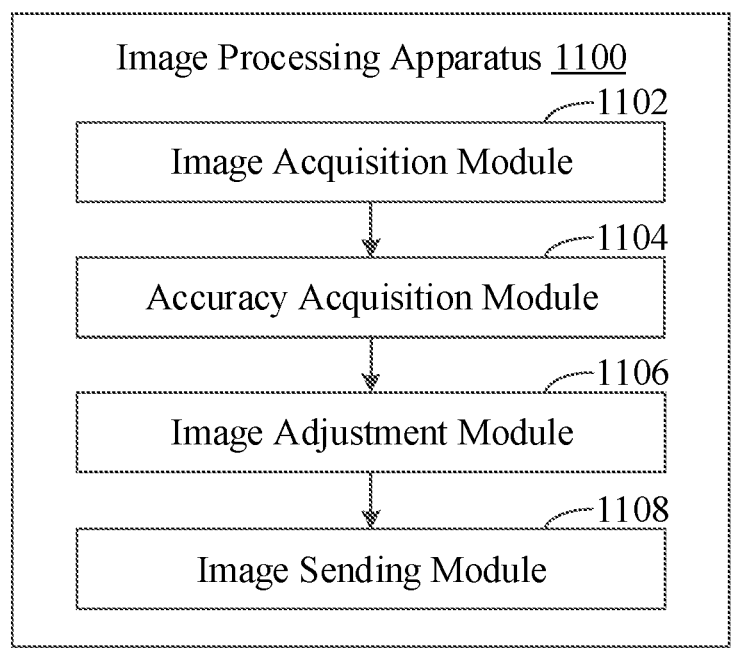
FIG. 16 is a schematic diagram of an image processing apparatus according to another embodiment.
Figure 17:
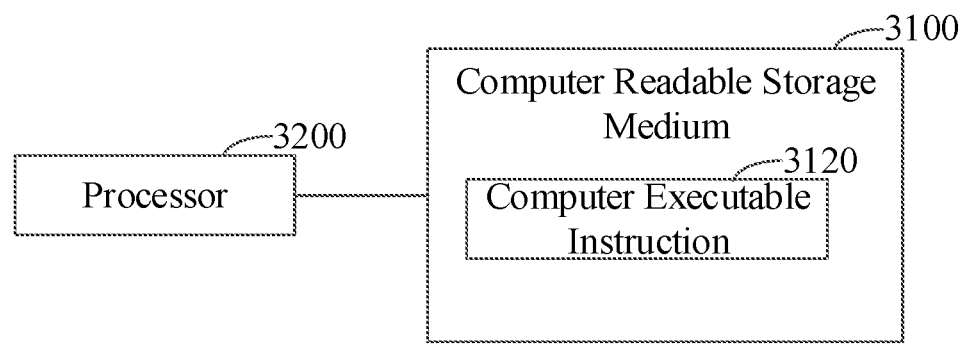
FIG. 17 is a schematic diagram of a computer readable storage medium according to an embodiment.

FIG. 16 is a schematic diagram of an image processing apparatus according to another embodiment. As illustrated in FIG. 16, the image processing apparatus 1100 includes an image acquisition module 1102, an accuracy acquisition module 1104, an image adjustment module 1106 and an image sending module 1108.

The image acquisition module 1102 is configured to acquire the image to be sent in response to the image collecting instruction.

The accuracy acquisition module 1104 is configured to, in response to detecting a face area in the image to be sent, acquire the application level corresponding to the target application that initiates the image collecting instruction, and to acquire the accuracy level corresponding to the application level.

The image adjustment module 1106 is configured to adjust the accuracy of the image to be sent according to the accuracy level, and to obtain the target image.

The image sending module 1108 is configured to send the target image to the target application.

According to the image processing apparatus provided in the above embodiment, the image to be sent may be acquired in response to the image collecting instruction. In response to detecting the face area existing in the image to be sent, the application level corresponding to the target application initiating the image collecting instruction may be acquired, and the corresponding accuracy level may be acquired according to the application level. And the accuracy of the image to be sent is adjusted according to the accuracy level to obtain the target image, and finally the target image is sent to the target application. Therefore, target images with different accuracies may be sent to different target applications. A target application with a low application level obtains a target image with a low accuracy, so that the safety of the sent target image may be guaranteed.

In an embodiment, the accuracy acquisition module 1104 is further configured to acquire the application level corresponding to the target application that initiates the image collecting instruction, and to acquire the safety level of the application operation corresponding to the image collecting instruction; and to acquire the accuracy level according to the application level and the safety level.

In an embodiment, the image adjustment module 1106 is further configured to adjust the resolution of the image to be sent according to the accuracy level, and to obtain the target image; or, to clip the image to be sent according to the accuracy level, and to obtain the target image.

In an embodiment, the image sending module 1108 is further configured to acquire the reference image pre-stored in an electronic device, and to perform the encryption processing on the target image according to the reference image, in which the reference image is an image containing reference speckle points and obtained by calibration; and to send the encrypted target image to the target application.

In an embodiment, the image sending module 1108 is further configured to acquire the pixel matrix corresponding to the reference image, and to acquire the encryption key according to the pixel matrix; and to perform the encryption processing on the target image according to the encryption key.

In an embodiment, the image sending module 1108 is further configured to acquire the time stamp contained in the image collecting instruction, in which the time stamp is configured to represent the time point of initiating the image collecting instruction; and to acquire the encryption level according to the interval between the time stamp and the current time point, and to perform the encryption processing corresponding to the encryption level on the target image according to the reference image.

In an embodiment, the image sending module 1108 is further configured to acquire the running state of the target application; and in response to the target application running in the foreground, to send the target image to the target application.

The division of each module in the image processing apparatus is for illustration only. In other embodiments, the image processing apparatus may be divided into different modules as required to implement all or part of the functions of the image processing apparatus.

An embodiment of the present disclosure further provides a computer readable storage medium 3100. When a computer executable instruction 3120 is executed by one or more processors 3200, one or more non-volatile computer readable storage media 3100 including the computer executable instruction 3120 makes the processors 3200 perform the image processing method provided in the above-described embodiments.

When executed on a computer, a computer program product containing instructions is configured to make the computer to perform an image processing method.

Any reference to the memory, the storage, the database, or other media used herein may include a non-volatile and/or a volatile memory. The suitable non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM), which acts as an external cache memory. By way of illustration, rather than limitation, the RAM is available in a variety of forms such as a static RAM (SRAM), a dynamic RAM (DRAM), a synchronous DRAM (SDRAM), a double data rate SDRAM (DDR SDRAM), an enhanced SDRAM (ESDRAM), a Synchlink DRAM (SLDRAM), a Rambus direct RAM (RDRAM), a direct memory bus dynamic RAM (DRDRAM), and a memory bus dynamic RAM (RDRAM).

The above embodiments only represent several embodiments of the present disclosure. The description of the above embodiments is specific and detailed, but should not be construed as limiting the scope of the present disclosure. It should be noted that for those skilled in the art, several variations and modifications may be made without departing from the concept of the present disclosure, and the variations and modifications fall within the scope of the present disclosure. Therefore, the protection scope of the present disclosure shall be subject to the attached claims.

What is claimed is:

1. A method for image processing, comprising:
    acquiring an accuracy level of a target application in response to an image collecting instruction initiated by the target application;
    adjusting an accuracy of an image to be sent according to the accuracy level, and obtaining a target image, comprising:
        adjusting a number of speckle points contained in a collected speckle image according to the accuracy level, and acquiring the target image according to the adjusted speckle image, in which the speckle image is an image formed by irradiating laser speckles collected by a laser camera on an object; and
    sending the target image to the target application, comprising:
        acquiring a reference image pre-stored in an electronic device, and performing an encryption processing on the target image according to the reference image, in which the reference image is an image containing reference speckle points and obtained by calibration; and sending the encrypted target image to the target application.

2. The method according to claim 1, wherein acquiring the accuracy level corresponding to the target application that initiates the image collecting instruction comprises:
    acquiring an application level corresponding to the target application that initiates the image collecting instruction, and acquiring a safety level of an application operation corresponding to the image collecting instruction; and
    acquiring the accuracy level according to the application level and the safety level.

3. The method according to claim 2, wherein the application level corresponds to a first accuracy weight, the safety level corresponds to a second accuracy weight, and acquiring the accuracy level according to the application level and the safety level comprises:
    calculating an accuracy weight value according to the first accuracy weight and the second accuracy weight; and
    determining the accuracy level in which the accuracy weight falls into.

4. The method according to claim 1, wherein adjusting the number of the speckle points contained in the collected speckle image according to the accuracy level comprises at least one of:
    adjusting the number of the speckle points contained in the laser speckles generated by diffraction of a laser light according to the accuracy level, and collecting the speckle image formed by irradiating the laser speckles on the object through a laser camera; or
    collecting a speckle image formed by irradiating preset laser speckles on the object through the laser camera, and adjusting a number of speckle points contained in the speckle image according to the accuracy level.

5. The method according to claim 1, acquiring the target image according to the adjusted speckle image comprises at least one of:
    obtaining a depth image through calculation according to the adjusted speckle image, and taking the depth image as the target image; or
    taking the adjusted speckle image as the target image.

6. The method according to claim 1, wherein performing the encryption processing on the target image according to the reference image comprises:
- obtaining a time stamp contained in the image collecting instruction, in which the time stamp is configured to represent a time point of initiating the image collecting instruction; and
- obtaining an encryption level according to an interval between the time stamp and a current time point, and performing an encryption processing corresponding to the encryption level on the target image according to the reference image.

7. The method according to claim 1, wherein sending the target image to the target application comprises:
- obtaining a running state of the target application; and
- sending the target image to the target application in response to the target application running in foreground.

8. The method according to claim 1, wherein acquiring the accuracy level of the target application in response to the image collecting instruction initiated by the target application comprises:
- acquiring the image to be sent in response to the image collecting instruction; and
- in response to detecting a face area in the image to be sent, obtaining an application level corresponding to the target application that initiates the image collecting instruction, and obtaining the accuracy level corresponding to the application level.

9. The method according to claim 8, wherein obtaining the application level corresponding to the target application that initiates the image collecting instruction, and obtaining the accuracy level corresponding to the application comprises:
- obtaining the application level corresponding to the target application that initiates the image collecting instruction, and obtaining a safety level of an application operation corresponding to the image collecting instruction; and
- obtaining the accuracy level according to the application level and the safety level.

10. The method according to claim 8, wherein adjusting the accuracy of the image to be sent according to the accuracy level, and obtaining the target image comprise at least one of:
- adjusting a resolution of the image to be sent according to the accuracy level, and obtaining the target image; or
- clipping the image to be sent according to the accuracy level and obtaining the target image.

11. The method according to claim 8, wherein sending the target image to the target application comprises:
- acquiring a reference image pre-stored in an electronic device, and performing an encryption processing on the target image according to the reference image, in which the reference image is an image containing reference speckle points and obtained by calibration; and
- sending the encrypted target image to the target application.

12. The method according to claim 11, wherein performing the encryption processing on the target image according to the reference image comprises:
- obtaining a pixel matrix corresponding to the reference image, and acquiring an encryption key according to the pixel matrix; and
- performing the encryption processing on the target image according to the encryption key.

13. The method according to claim 11, wherein performing the encryption processing on the target image according to the reference image comprises:
- obtaining a time stamp contained in the image collecting instruction, in which the time stamp is configured to represent a time point of initiating the image collecting instruction; and
- obtaining an encryption level according to an interval between the time stamp and a current time point, and performing an encryption processing corresponding to the encryption level on the target image according to the reference image.

14. The method according to claim 8, wherein sending the target image to the target application comprises:
- obtaining a running state of the target application; and
- sending the target image to the target application in response to the target application running in foreground.

15. An image processing apparatus, comprising:
- one or more processors; and
- a memory storing instructions executable by the one or more processors;
- wherein the one or more processors are configured to:
- acquire an accuracy level of a target application in response to an image collecting instruction initiated by the target application;
- adjust an accuracy of an image to be sent according to the accuracy level, and to obtain a target image; and
- send the target image to the target application,
- wherein the one or more processors are configured to adjust the accuracy of the image to be sent according to the accuracy level, and to obtain a target image by performing acts of: adjusting a number of speckle points contained in a collected speckle image according to the accuracy level, and to acquire the target image according to the adjusted speckle image, in which the speckle image is an image formed by irradiating laser speckles collected by a laser camera on an object and to acquire a reference image pre-stored in an electronic device, and to perform an encryption processing on the target image according to the reference image, in which the reference image is an image containing reference speckle points and obtained by calibration; and to send the encrypted target image to the target application.

16. The apparatus according to claim 15, wherein the one or more processors are configured to, acquire the image to be sent in response to the image collecting instruction; and in response to detecting a face area in the image to be sent, obtain an application level corresponding to the target application that initiates the image collecting instruction, and obtain the accuracy level corresponding to the application level.

17. A non-transitory computer readable storage medium having a computer program stored thereon, wherein when the computer program is executed by a processor, the computer program implements an image processing method, and the method comprises:
- acquiring an accuracy level of a target application in response to an image collecting instruction initiated by the target application;
- adjusting an accuracy of an image to be sent according to the accuracy level, and obtaining a target image, comprising:
  - adjusting a number of speckle points contained in a collected speckle image according to the accuracy level, and acquiring the target image according to the adjusted speckle image, in which the speckle image is an image formed by irradiating laser speckles collected by a laser camera on an object; and sending the target image to the target application, comprising:

acquiring a reference image pre-stored in an electronic device, and performing an encryption processing on the target image according to the reference image, in which the reference image is an image containing reference speckle points and obtained by calibration; and sending the encrypted target image to the target application.

\* \* \* \* \*